United States Patent
Lai et al.

(10) Patent No.: US 11,972,349 B1
(45) Date of Patent: Apr. 30, 2024

(54) FLEXIBLE COMPUTE ARRAY UTILIZATION IN A TENSOR PROCESSOR

(71) Applicant: Meta Platforms, Inc., Menlo Park, CA (US)

(72) Inventors: Liangzhen Lai, Fremont, CA (US); Yu Hsin Chen, Santa Clara, CA (US); Vikas Chandra, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 821 days.

(21) Appl. No.: 17/096,209

(22) Filed: Nov. 12, 2020

(51) Int. Cl.
| | |
|---|---|
| *G06N 20/00* | (2019.01) |
| *G06F 17/15* | (2006.01) |
| *G06F 17/16* | (2006.01) |
| *G06N 3/08* | (2023.01) |

(52) U.S. Cl.
CPC ............ *G06N 3/08* (2013.01); *G06F 17/15* (2013.01); *G06F 17/16* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,710,265 B1 | 7/2017 | Temam | |
| 9,836,691 B1 | 12/2017 | Narayanaswami | |
| 10,175,980 B2 | 1/2019 | Temam | |
| 10,496,326 B2 | 12/2019 | Temam | |
| 10,534,607 B2 | 1/2020 | Temam | |
| 10,802,956 B2 | 10/2020 | Temam | |
| 2018/0218260 A1* | 8/2018 | Brand | G06N 3/045 |
| 2019/0205756 A1* | 7/2019 | Temam | G06N 20/00 |
| 2020/0005128 A1 | 1/2020 | Temam | |
| 2020/0160226 A1* | 5/2020 | Ross | G06N 3/08 |
| 2022/0138551 A1* | 5/2022 | Marani | G06N 3/08 |
| | | | 706/25 |

OTHER PUBLICATIONS

CuDNN: Efficient Primitives for Deep Learning, Sharan Chetlur, Cliff Woolley, Philippe Vandermersch, Jonathan Cohen, John Tran NVIDIA, Santa Clara, CA 95050 https://doi.org/10.48550/arXiv.1410.0759, (Year: 2014).*
Dettmers, Deep Learning in a Nutshell: Core Concepts, pp. 1-10, 2020.
Jiao, et al., High-Performance Machine Learning, Feb. 18, 2020 IEEE, pp. 136-138.
Emer, et al., DNN Accelerator Architectures, ISCA Tutorial, 70 pages, 2019.

* cited by examiner

*Primary Examiner* — Xuyang Xia
(74) *Attorney, Agent, or Firm* — Greenberg Traurig, LLP

(57) ABSTRACT

In one embodiment, a method for machine learning acceleration includes receiving instructions to perform convolution on an input tensor using a filter tensor, determining that the size of a first dimension of the input tensor is less than a processing capacity of each of multiple subarrays of computation units in a tensor processor, selecting a second dimension of the input tensor along which to perform the convolution, selecting, based on the second dimension, one or more dimensions of the filter tensor, generating (1) first instructions for reading, using vector read operations, activation elements in the input tensor organized such that elements with different values in the second dimension are stored contiguously in memory, and (2) second instructions for reading weights of the filter tensor along the selected one or more dimensions, and using the first and second instructions to provide the activation elements and the weights to the subarrays.

20 Claims, 15 Drawing Sheets

FLEXIBLE COMPUTE ARRAY UTILIZATION IN A TENSOR PROCESSOR

TECHNICAL FIELD

This disclosure generally relates to accelerators for machine learning models and, more particularly, to flexible compute array utilization in a tensor processor.

BACKGROUND

Neural networks are increasingly being used to implement machine learning (ML) techniques to solve a wide variety of problems including, but not limited to, object identification, feature classification, or content-driven image processing. Some neural networks, which may be referred to as convolutional neural networks, include one or more convolutional layers. In a convolutional neural network (CNN), the convolutional layers typically account for the vast majority of the computations performed and the data movement within the CNN and/or between the CNN and other elements of an ML model, making them a performance bottleneck. Therefore, existing ML accelerators focus on using high compute parallelism along with an optimized data orchestration throughout the memory hierarchy to speed up the processing of convolutional layers. However, existing ML accelerators may not perform well when implemented within edge devices that have strict power consumption constraints and that run inference exercises using previously trained models in real time. For example, existing ML accelerators may not perform well within artificial reality systems for virtual reality (VR), augmented reality (AR), mixed reality (MR), or hybrid reality implemented on standalone head-mounted displays (e.g., on AR/VR headsets), mobile devices or other edge computing devices.

SUMMARY OF PARTICULAR EMBODIMENTS

Innovative aspects of the subject matter described in this specification may be embodied in a method for machine learning acceleration that supports flexible compute array utilization in a tensor processor. The method includes receiving instructions to perform convolution on an input tensor using weights in a filter tensor, determining a size of a first dimension of the input tensor and, in response to determining that the size is less than a processing capacity of each of one or more subarrays of computation units in a tensor processor, selecting a second dimension of the input tensor along which to perform the convolution. The method also includes selecting, based on the second dimension, one or more dimensions of the filter tensor, generating (1) first instructions for reading, using vector read operations, activation elements in the input tensor organized such that activation elements with different values in the second dimension are stored contiguously in memory, and (2) second instructions for reading weights of the filter tensor along the selected one or more dimensions, and using the first instructions and the second instructions to provide the activation elements and the weights to the one or more subarrays.

Other embodiments of these aspects include corresponding systems, apparatus, and computer programs, configured to perform the actions of the methods, encoded on computer storage devices.

These and other embodiments may each optionally include one or more of the following features. For instance, in one or more of the disclosed embodiments, generating the first instructions may include generating instructions for performing vector read operations at addresses having a granularity less than the vector read size such that consecutive vector read operations fetch overlapping collections of activation elements.

In one or more of the disclosed embodiments, the input tensor may be a multi-dimensional tensor including at least an innermost channel dimension, a width dimension, and a height dimension, the first dimension may be the channel dimension, the size of the first dimension of the input tensor may be equal to one, and the second dimension may be the width dimension or the height dimension.

In one or more of the disclosed embodiments, the filter tensor may include one or more three-dimensional (3D) filter tensor of weights, each having a filter depth dimension, a filter width dimension, and a filter height dimension, the size of the filter tensor in the filter depth dimension may be equal to the size of the first dimension of the input tensor, the selected one or more dimensions of the filter tensor may include one or more of the filter width dimension and the filter height dimension, and the method may further include storing the weights in a weight buffer such that weights with different values in a first one of the selected one or more dimensions of the filter tensor are stored contiguously in the weight buffer.

In one or more of the disclosed embodiments, the filter tensor may include one or more three-dimensional (3D) filter tensors of weights, and each of the one or more subarrays of computation units in the tensor processor may include a two-dimensional array of multiply-and-accumulate (MAC) computation units that operate in parallel to apply weights defined for one or more of the 3D filter tensors to a respective subset of a spatial partition of the input tensor and produce a respective subset of a spatial partition of an output tensor, the two-dimensional arrays in the one or more subarrays having a common subarray width and a common subarray height. Determining that the size is less than the processing capacity of each of the one or more subarrays of computation units in the tensor processor may include determining that the size is less than the common subarray height.

In one or more of the disclosed embodiments, using the first instructions and the second instructions to provide the activation elements and the weights to the one or more subarrays may include, in a first cycle of a multi-cycle convolution, providing a same first collection of activation elements to two or more subarrays, the first collection of activation elements corresponding to a first one of the vector read operations, providing a same collection of weights to the two or more subarrays, and processing, by each of the two or more subarrays, a respective subset of the first collection of activation elements while applying the collection of weights.

In one or more of the disclosed embodiments, the method may further include, in a second cycle of the multi-cycle convolution, providing a same second collection of activation elements to the two or more subarrays, the second collection of activation elements corresponding to a second one of the vector read operations and including a subset of the first collection of activation elements and additional activation elements stored contiguous to the subset of the first collection of activation elements in the activation memory, providing the collection of weights to the two or more subarrays, and processing, by each of the two or more subarrays, a respective subset of the second collection of activation elements while applying the collection of weights.

In one or more of the disclosed embodiments, processing a respective subset of the first collection of activation elements may include providing the subset of the first collection of activation elements to a respective subset of the MAC computation units in each of the two or more subarrays, providing a subset of the collection of weights to the respective subset of the MAC computation units in each of the two or more subarrays, and providing weight values equal to zero to the MAC computation units in each of the two or more subarrays other than the respective subsets of the MAC computation units in each of the two or more subarrays.

In one or more of the disclosed embodiments, the method may further include, in response to determining that the size is less than the processing capacity of each of the one or more subarrays of computation units in the tensor processor, storing the activation elements in the input tensor in an activation memory such that activation elements with different values in the second dimension are stored contiguously in the activation memory. The details of one or more embodiments of the subject matter described in this specification are set forth in the accompanying drawings and the description below. Other potential features, aspects, and advantages of the subject matter will become apparent from the description, the drawings, and the claims.

The embodiments disclosed herein are only examples, and the scope of this disclosure is not limited to them. Particular embodiments may include all, some, or none of the components, elements, functions, operations, or steps of the embodiments disclosed above. Embodiments according to the invention are in particular disclosed in the attached claims directed to a method, a storage medium, a system and a computer program product, wherein any element mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the elements thereof are disclosed and can be claimed regardless of the dependencies chosen in the attached claims. The subject-matter which can be claimed comprises not only the combinations of elements as set out in the attached claims but also any other combination of elements in the claims, wherein each element mentioned in the claims can be combined with any other element or combination of other elements in the claims. Furthermore, any of the embodiments and elements thereof described or depicted herein can be claimed in a separate claim and/or in any combination with any embodiment or element described or depicted herein or with any of the elements of the attached claims.

DESCRIPTION OF EXAMPLE EMBODIMENTS

Figure 1:
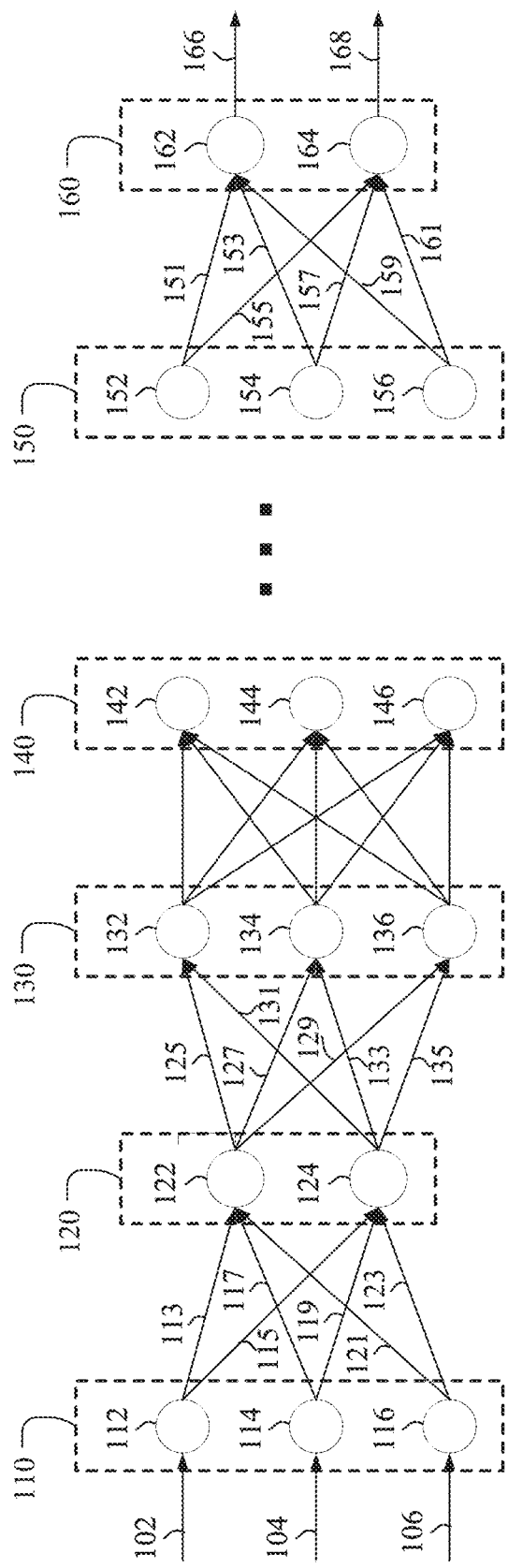
FIG. 1 illustrates selected elements of an example of a multilayer perception (MLP) neural network.

In particular embodiments, utilization of the compute arrays in a tensor processor for machine learning acceleration may vary based on the configuration of the input data. In particular, the addressing scheme with which activations are loaded into the compute arrays for processing and the organization of the corresponding weights may be adaptable to optimize compute array utilization when processing input tensors with different relative sizes among their dimensions. The tensor processor may be a single-instruction-multiple-data (SIMD) machine that includes a compute array capable of performing vector operations that collectively implement higher-level tensor instructions using data parallelism or model parallelism in a neural network. In one example, a coarse-grained, multi-cycle tensor instruction may represent a nested loop that iterates over multiple dimensions of an input feature map to produce an output feature map having the same or different dimensions as the input feature map. The input to a given convolution layer in a convolutional neural network (CNN) may be a multi-dimensional tensor, which may also be referred to as an input feature map, and the individual elements of the input feature map may be referred to as activations. In many applications, the tensor data may be organized such that data elements having the same values in some dimensions but different values in particular dimensions (e.g., in an "innermost" dimension) are contiguous in memory. For example, a typical four-dimensional tensor may be of size N×H×W×C where C (channel) is the innermost dimension, followed by W (width), H (height), and finally N (batch size) as the outermost dimension. In this example, the tensor data may be organized such that data elements having the same values in the N, H, and W dimensions but different values in the C dimension are stored contiguously in the memory.

The compute array of the tensor processor may include multiple subarrays of multiply-and-accumulate (MAC) computation units of a given size that operate in parallel to apply the weights defined for a convolution filter to portions of an input feature map and produce portions of an output feature map using a collection of two-dimensional (2D) convolution operations. The convolution filter applied by the tensor processor may include K three-dimensional (3D) convolution filters, each including 2D kernels having a common kernel width (S) and a common kernel height (R) with a kernel depth (C). The kernel depth, which corresponds to the number of channels for the filter, may be equal to the input feature map depth. The number of 3D filters (K) may correspond to the number of channels in the output feature map. The tensor processor may also include an activation memory that stores the input feature map elements to be fed to various ones of the subarrays, a local buffer that stores the filter weights to be fed to various ones of the subarrays, a first flexible many-to-many crossbar that reads input feature map elements from local memory and feeds them to the appropriate subarrays, and another flexible crossbar that loads filter weights from local memory and feeds them to the appropriate subarrays. A control module within the tensor processor, or a controller shared between multiple tensor processors, may control the operation of the crossbars. The tensor processor may receive and execute fine-grained tensor instructions expressed as machine language instructions. Each of these fine-grained tensor instructions may, for example, represent a vector read operation, a vector write operation, a vector addition operation, or a vector multiplication operation to be performed by the hardware compute array within the tensor processor or may represent a non-linear instruction to be applied to various intermediate outputs of the hardware compute array to produce an element of an output feature set for a given coarse-grained tensor instruction. The controller may ensure that the appropriate subsets of the input feature set and the weights to be applied for the operations to be performed during a particular cycle, which may correspond to a single convolution layer, have been loaded into the local memories of the tensor processor. Patterns for generating addresses identifying the input activations in the local activation memory for each 2D convolution may be generated by the compiler as part of generating the tensor instructions. For example, the compiler may know the configuration (size and shape) of the tensor that is input to the neural network and/or to particular convolutional layers thereof. The patterns for generating the addresses may be based on the relative sizes of the input tensor in each of multiple dimensions and the order in which the data is to be processed from the innermost dimension to the outermost dimension of a nested loop. The controller hardware may generate the specific addresses for reading the weights and the input activations from local memory, and for writing out the results, using these addressing patterns.

Convolutional neural networks used in end-user applications (e.g., AR/VR applications) typically need to support input and output feature maps with a wide variety of shapes and sizes, especially along the channel dimension. For example, the relative sizes and shapes of the input tensors and output tensors of a CNN in different dimensions may vary for different applications and/or for each intermediate layer within the CNN. In many cases, the first layer may include very high resolution data. In such cases, if the performance of the CNN when processing that first layer is poor, the overall performance of the CNN may be poor. With existing ASIC accelerators, supporting this diversity can result in decreased hardware utilization and a corresponding loss of performance and energy efficiency. For example, some existing accelerators divert convolution operations for a neural network layer in which the input tensor has a small number of channels to alternate hardware, such as a CPU, DSP, or other general-purpose processor for execution. Other existing accelerators include a fixed-size array of computation units and corresponding computations that operates with greatly reduced hardware utilization when the problem size is smaller than the computational capacity of the fixed-size array.

As described in more detail below, the tensor processors and corresponding compilers disclosed herein may provide flexible compute array utilization based on the configuration and dimensions of the input feature map. For example, when the size of the input feature map for a given convolution layer in the innermost dimension is greater than or equal to the vector read size and/or the common height of the subarrays of MAC computation units in a tensor processor, contiguous activations may be fetched along the innermost dimension and provided to respective rows of MAC computation units. However, when the size of the input feature map for a given convolution layer in the innermost dimension is equal to 1 or is significantly less than the vector read size, contiguous activations may be fetched along the next dimension instead of, or in combination with, the innermost dimension and provided to respective rows of MAC computation units. In any of these cases, the compiler may generate the appropriate addressing patterns for each tensor instruction and may organize the filter weights to perform the desired operations in accordance with the organization of the input feature map to optimize resource utilization in the compute array for each case.

Before discussing the present embodiments in further detail, it may be beneficial to provide some background information regarding neural networks and machine learning (ML) models in general. A neural network, or neural net, is a nodal network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

FIG. 1 illustrates selected elements of an example of a multilayer perception neural network, in accordance with particular embodiments. Its structure may include multiple hidden, e.g., internal, layers that map an input layer 110 that receives a set of inputs or a vector input to an output layer 160 that includes a set of outputs or a vector output. Each layer may include any given number of nodes, which are herein illustratively shown as circles within each layer. For example, input layer 110 includes three nodes, shown as nodes 112 114, and 116, and output layer 160 includes two nodes, shown as 162 and 164. The example neural network illustrated in FIG. 1 includes at least four hidden layers but may include additional hidden layers not shown in FIG. 1. In the illustrated example, the first hidden layer 120 includes two nodes, shown as nodes 122 and 124, while hidden layers 130, 140, and 150 each include three nodes, shown as nodes 132, 134, and 136, nodes 142, 144, and 146, and nodes 152, 154, and 156, respectively. Generally, the deeper the MLP (e.g., the greater the number of hidden layers in the MLP), the greater its capacity to learn. The input layer 110 receives a vector input, illustratively shown as a three-dimensional vector consisting of inputs 102, 104 and 106, and may apply the received vector input to the first hidden layer 120 in the sequence of hidden layers. The output layer 160 receives the output from the last hidden layer in the multilayer model, e.g., 150, processes its inputs, and produces a vector output result, illustratively shown as a two-dimensional vector consisting of outputs 166 and 168.

Typically, each neuron (or node) produces a single output that is fed forward to neurons in the layer immediately following it. However, each neuron in a hidden layer may receive multiple inputs, either from the input layer or from the outputs of neurons in a preceding hidden layer, such as the immediately preceding hidden layer or an earlier hidden layer. In general, each node may apply a function to its inputs to produce an output for that node. Nodes in hidden layers, including layers referred to as learning layers, may apply the same function or a different function to their respective input(s) to produce their respective output(s). Some nodes, however, such as the nodes in the input layer 110 may receive only one input and may be passive, meaning that each node may simply relay the value of its single input to its output(s) thus providing a copy of the input to the output(s).

In the example neural network illustrated in FIG. 1, the outputs of nodes 112, 114, and 116 of input layer 110 feed forward as inputs to hidden layer 120, which includes nodes 122 and 124. The outputs of nodes 122 and 124, in turn, feed forward as inputs to hidden layer 130, which includes nodes 132, 134, and 136, the outputs of nodes 132, 134, and 136 feed forward as inputs to hidden layer 140, which includes nodes 142, 144, and 146, and so on. Finally, the outputs of nodes 152, 154, and 156 of the final hidden layer 150 feed forward as inputs to output layer 160, which includes nodes 162 and 164. Interconnections, or links, between neurons, shown in FIG. 1 as arrows between various nodes, may have respective weights associated with them. For example, the interconnection between node 112 of input layer 110 and node 122 of hidden layer 120 may be associated with a weight 113. In addition, the interconnection between node 112 of input layer 110 and node 124 of hidden layer 120 may be associated with a weight 115, the interconnection between node 114 of input layer 110 and node 122 of hidden layer 120 may be associated with a weight 117, the interconnection between node 114 of input layer 110 and node 124 of hidden layer 120 may be associated with a weight 119, the interconnection between node 116 of input layer 110 and node 122 of hidden layer 120 may be associated with a weight 121, and the interconnection between node 116 of input layer 110 and node 124 of hidden layer 120 may be associated with a weight 123. Similarly, the interconnections between the nodes of hidden layers 120 and 130 may be associated with weights 125, 127, 129, 131, 133, and 135, respectively, and the interconnections between the nodes of hidden layers 150 and output layer 160 may be associated with weights 151, 153, 155, 157, 159, and 161, respectively. Weights associated with the remaining interconnections between nodes in the illustrated neural network are not shown in FIG. 1 for simplicity.

Typically, except for the input layer, a node (neuron) may receive as input the outputs of nodes in its immediately preceding layer. Each node may calculate its output by, e.g., multiplying each of its inputs by each input's corresponding interconnection weight, summing the products of it inputs, adding (or multiplying by) a constant defined by another weight or bias that may be associated with that particular node, and applying a function, such a non-linear or logarithmic function, to the result. The non-linear function may be referred to as an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

Figure 2:
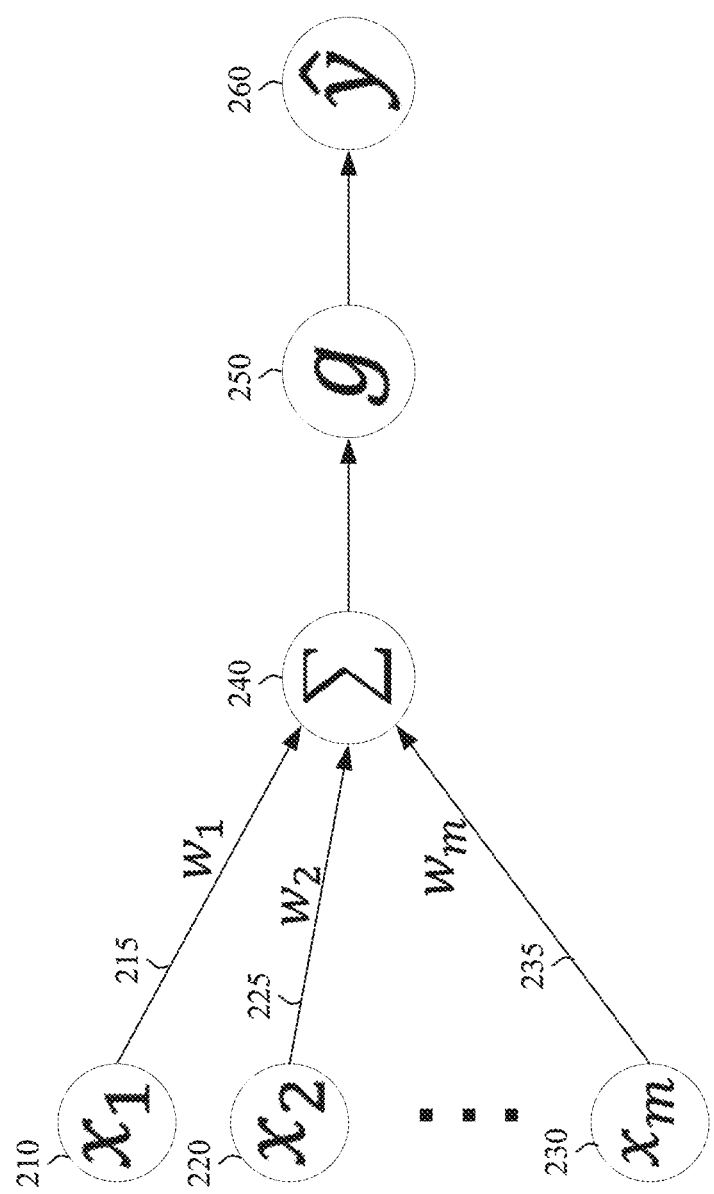
FIG. 2 illustrates selected elements of a simplified building block of a Deep Neural Network (DNN).

FIG. 2 illustrates, in a simplified view, selected elements of a building block of a Deep Neural Network (DNN). The illustrated building block generates an output vector ŷ for a particular neural network node given inputs $x_1$ (210), $x_2$ (220), and $x_3$ (230), respective interconnection weights $w_1$ (215), $w_2$ (225), and $w_3$ (235), and a non-linear activation function g (250). In the illustrated example, the output vector ŷ may be determined by applying the activation function g (250) to a linear combination of the inputs multiplied by their corresponding weights, as follows:

$$\hat{y} = g\left(\sum_{i=1}^{m} x_i w_i\right)$$

During a training, or learning, stage, the neural network may learn, e.g., may be trained to determine, appropriate weight values to achieve a desired output for a given input. Before the neural network is trained, the weights may be individually assigned an initial value, such as a random, and optionally non-zero, value. Various methods of assigning initial weights are known in the art. The weights are then trained, or optimized, so that for a given training vector input, the neural network produces an output close to a desired, e.g., a predetermined, training vector output. The desired output against which the current output is compared may be referred to as a label for the input data. A training vector input and its corresponding training vector output may be termed an input-output training pair, and a training data set may include multiple input-output training pairs, e.g., tens to millions, or more. In this manner, the weights may be incrementally adjusted in thousands of iterative cycles, such as by a technique termed back-propagation. Several back-propagation techniques are known in the art, including several based on gradient descent, such as batch gradient descent, stochastic gradient descent (SGD), which may include mini-batch gradient descent, distributed synchronous and asynchronous SGD, elastic averaging stochastic gradient descent (EASGD), Hogwild, etc. The different back-propagation techniques may differ in how specific aspects of gradient descent are implemented, but in general, irrespective of the back-propagation technique used, in each cycle of back-propagation, a training input (e.g., vector input) is fed forward through the neural network to determine its actual output (e.g., vector output). An error for each output neuron, or output node, is then calculated based on the actual neuron output and a target or desired training output for that neuron. The process then propagates back through the neural network (in a direction from the output layer back to the input layer), updating the weights based on how much effect each weight has on the overall error so that the output of the neural network moves closer to the desired training output. This cycle may then be repeated until the actual output of the neural network is within an acceptable error range of the desired training output. In machine learning, an epoch typically refers to one complete pass, including back-propagation, if applicable, of the full training dataset to be learned through the machine-learning model. In one epoch, the full training dataset may be submitted to the learning algorithm in a single training iteration, in which case a "batch" of training data is used, or the full training dataset may be submitted in the aggregate after multiple training iterations, each using a subset of the training dataset referred to as a "mini-batch".

Construction of a neural network model, or a machine-learning model in general, may include a learning stage, which may also be referred to as a training stage, and an inference stage, which may also be referred to as an operational, execution, or service stage. In the learning stage, the neural network may be trained for a specific purpose and may be provided with a set of training examples, including training inputs and training outputs provided as input-output training pairs, and optionally including a set of validation examples to test the progress of the training. During this learning process, various weights associated with nodes and node-interconnections (e.g., links) in the neural network may be incrementally adjusted in order to reduce the error between an actual output of the neural network and the desired training output. In this manner, a multi-layer feed-forward neural network, such as that discussed above, may be made capable of approximating any measurable function to any desired degree of accuracy. The result of the learning stage is a machine learning model that has been trained. In the inference stage, an input with unknown outputs may be submitted to the trained machine learning model, e.g., to server or edge device executing the trained ML model, which may apply what has been learned to process the input to produce an output prediction.

For ease of illustration, some aspects of a neural network framework may be disclosed herein within the context of practical example implementations. Due to real-world hardware limitations, neural networks may have practical size limits. For example, some ML models may achieve large sizes of 10 GB, or more, which may require a long time to train and complicate their hardware implementation. Therefore, in particular embodiments, an ML model may be distributed among multiple similar machines, e.g., machines having identical or substantially similar architectures, using various distributive techniques. Furthermore, it is typically desirable that the hardware, e.g., a computing system, used to train an ML model be tailored to the ML model itself and that all training be done on the same computing system. At times, a computing system used to train an ML model may include fast computing devices optimized for computational capacity and remote memory banks, e.g., parameter servers, that may hold interim parameter values, e.g., weight values.

As used herein, the terms "feature" or "features" may refer to input data or output data associated with a convolution operation. In particular embodiments, the output of each layer of a convolutional neural network may be represented by features that no longer resemble the original input in content, size, and/or shape. For example, an input image including 10×10 pixels with RGB channels may be represented by 10×10×3 features. After one round of convolution, the output may be represented by 4×4×2 features that might or might not look like an image. After a second round of convolution in which the 4×4×2 features are processed, the output may be represented by a 1×1 feature that looks nothing like an image, in this example. Features organized in a 3D manner may be referred to herein as a "tensor" having dimensions of height (x), width (y), and a number of channels (z). Note that image data is a very specific type of input that is commonly processed using machine learning and neural networks, but it is by no means the only type of data that can be processed using these techniques and using the ML accelerators described herein.

For example, the input data processed by a convolutional neural network may represent a depth map, parameterized user information, a heat map for weather forecasting, etc.

Computing systems and system configurations may be tailored not only for particular types of machine learning models and training algorithms, but also for the types of data the machine learning model is designed to process. For example, machine learning models may receive different types of inputs or features, such as dense inputs, which are typically long vectors, sparse inputs, or a combination of both. Dense feature vectors may be used to represent dense inputs and sparse feature vectors may be used to represent sparse inputs. A dense feature vector may be represented by a mostly-populated vector, e.g., a vector having mostly non-zero entries/cells. A common example of a dense feature vector is image data. As another example, a dense feature vector may include determinable descriptors common to or determinable for most users or circumstances, depending upon the specific application, which may be gleaned from multiple sources. For examples, dense features may include personal information associated with a user, information identifying a source of the input information, or other contextual information, such as a location, a time-of-day, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may comprise many descriptor types, e.g., many signal/value sources, that together may characterize, describe, or represent a user or circumstance, a dense input may be a large, dense vector with one or more cells/dimensions/entries in the dense vector being designated to each descriptor type.

A sparse input may reflect more semantic information related to a particular task objective. The sparse input may be defined by a sparse feature vector that identifies selections within a larger list(s) of options, such as lists that may further be divided/grouped into different categories. This may be the case when the list of identifiers that comprises the sparse input identifies individual selections from a larger list of options, such as those provided by the dense vector. As a result, a sparse vector may be characterized by having mostly zero entries, and a few non-zero entries. Consequently, a sparse vector may be represented as a series of indexes pointing to select cell positions in the larger list having non-zero values, along with each index's corresponding non-zero value for that position, with the understanding that all other positions not identified by index have a default zero value. Sparse inputs may not necessarily be directly descriptive of a user or circumstance but may instead provide auxiliary information indirectly related to the user or circumstance. Typically, because of their many zero-entry cells, sparse vectors may not be well-suited for direct input to a neural network.

Figure 3:
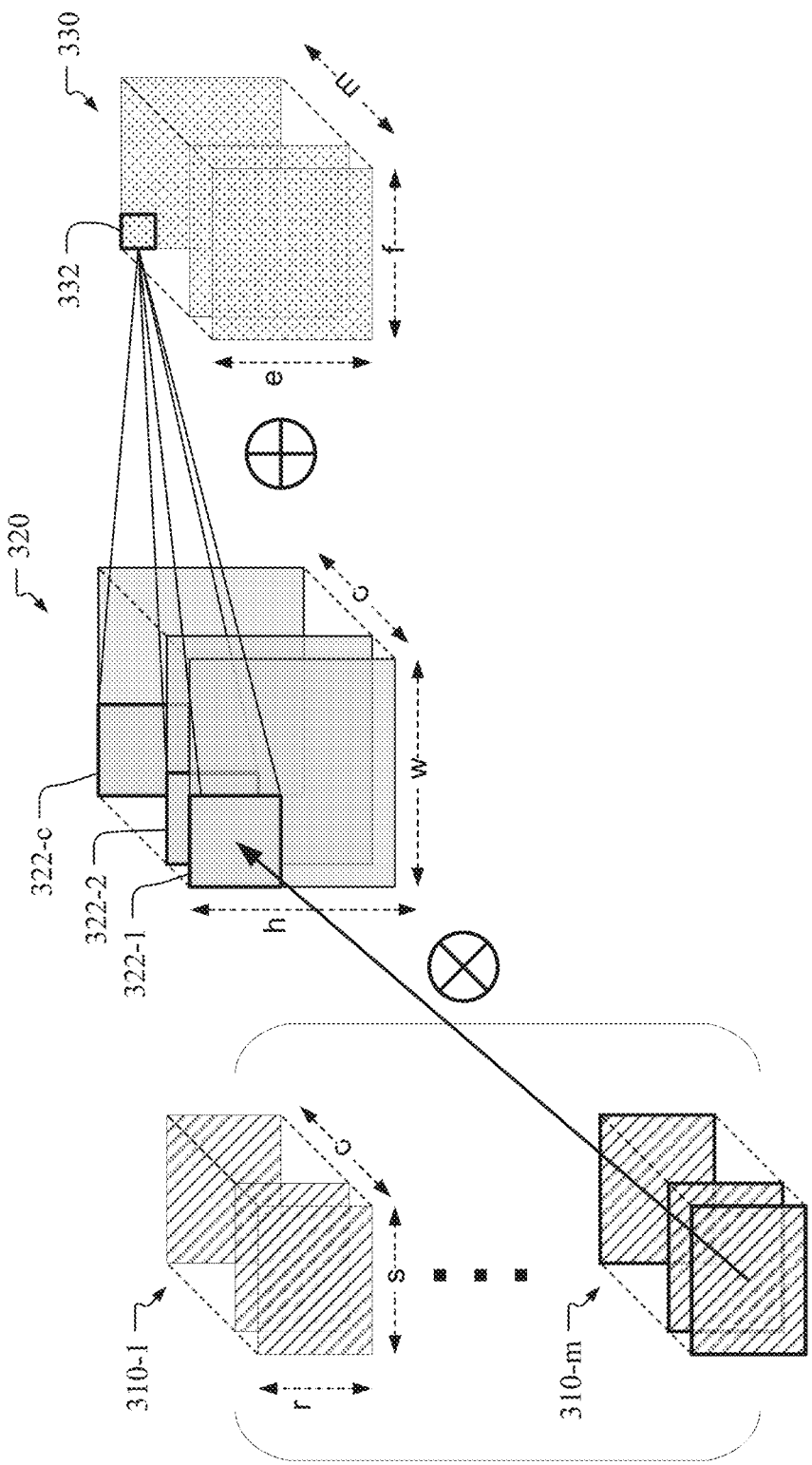
FIG. 3 illustrates selected elements of an example convolutional layer in a convolutional neural network (CNN).

FIG. 3 illustrates selected elements of an example convolutional layer in a convolutional neural network. In the illustrated example, a three-dimensional (3D) output feature map 330 is generated by performing a series of two-dimensional (2D) convolution operations over a 3D input feature map 320 using a collection of 2D convolution filters 310. More specifically, the input feature map 320 has dimensions h (height)×w (width)×c (where c represents the number of input channels) and the output feature map 330 has dimensions e×f×m (where m represents the number of output channels). In this example, multiple filters 310 are to be applied to the input feature map to generate each element, of each channel, of the output feature map. More specifically, a respective different filter 310 is applied to produce the elements of the output feature map for each given output channel. Therefore, the number of filters 310 (i.e., m) matches the number of output channels (m).

As shown in FIG. 3, each 3D filter 310 includes a respective 2D kernel of dimensions r×s for each input channel c, and each 2D filter kernel defines a collection of weights, where a respective weight value is associated with each kernel element, as identified by its position within the r×s kernel. For example, each 2D filter kernel may be represented as a 3×3 grid of weights to be convolved with a similarly-sized collection of features within input feature map 320. More specifically, each 2D kernel of filter 310-$m$ is applied in a convolution operation over the elements in a respective channel of input feature map 320. For example, a first 2D kernel of filter 310-$m$ provides the weights that are multiplied by respective values of the elements in an r×s sized portion 322-1 of the elements of a first channel of input feature map 320, a second 2D kernel of filter 310-$m$ provides the weights that are multiplied by respective values of the elements in an r×s sized portion 322-2 of the elements of a second channel of input feature map 320, and so on, such that a final 2D kernel of filter 310-$m$ provides the weights that are multiplied by respective values of the elements in an r×s sized portion 322-$c$ of the elements of the last channel of input feature map 320. The results of these multiplication operations are then combined to generate a single element 332 of a single channel of output feature map 330, as shown in FIG. 3. This process is repeated as the 2D kernels of filter 310-$m$ are applied to other portions of input feature map 320 to produce the remaining elements of output feature map 330 in the same output channel as element 332, and as the 2D kernels of respective other ones of the filters 310 are applied to input feature map 320 to produce the elements of output feature map 330 in each of the remaining output channels.

Figure 4:
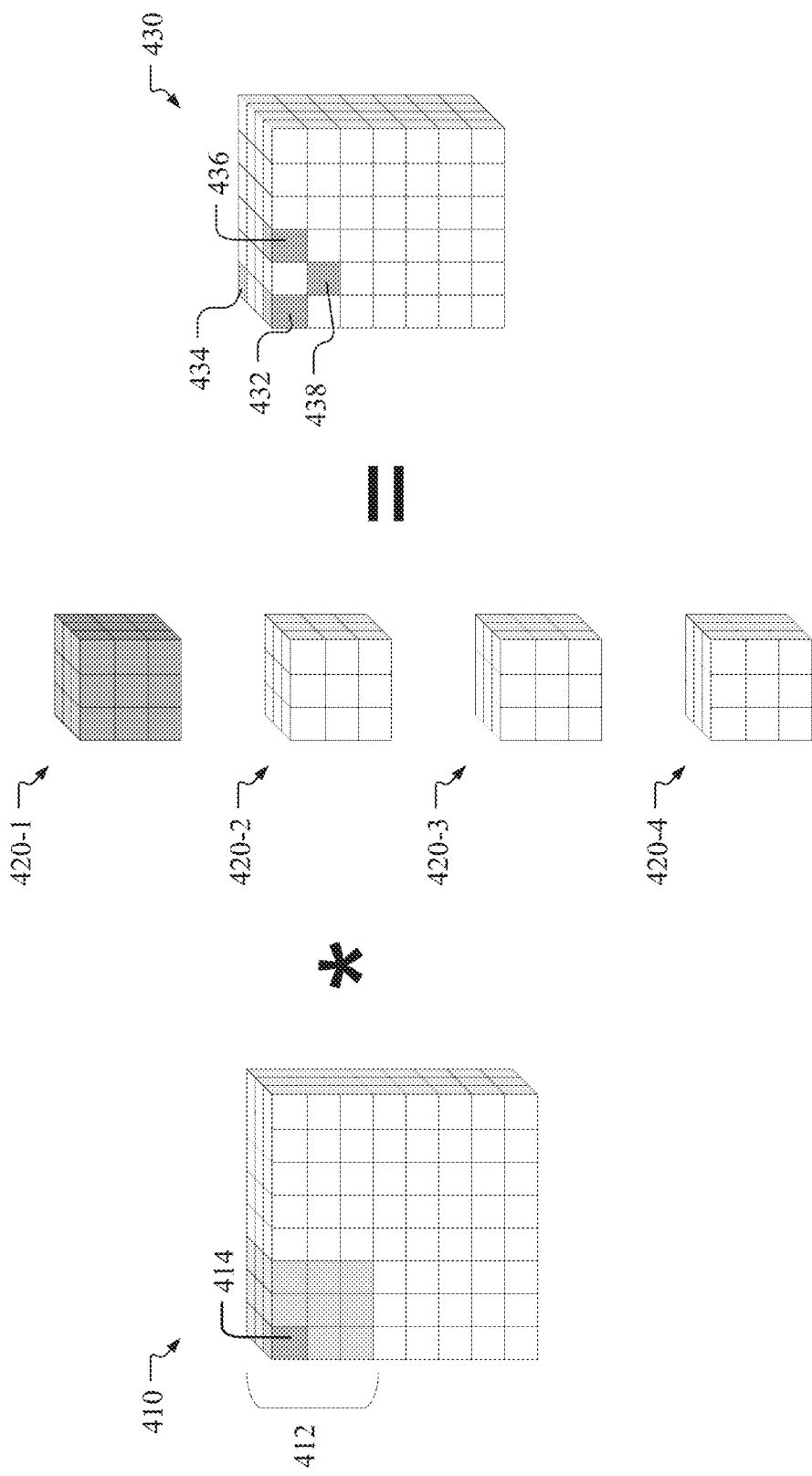
FIG. 4 illustrates an example multi-level convolution operation.

FIG. 4 illustrates an example multi-channel convolution operation, in accordance with particular embodiments. In this example, a multi-channel (3D) output feature map 430 is generated by the application of multiple 3D filters 420 to successive portions of a multi-channel (3D) input feature map 410. In this example, the dimensions of input feature map 430 are X×Y×Zin, where Zin represents the number of input channels, and the dimensions of output feature map 430 are Xout×Yout×Zout, where Zout represents the number of output channels. Each 3D filter 420 includes a respective 2D kernel of dimensions KernelX×KernelY for each output channel zout in Zout, where kx and ky represent the x/y position of a particular element of the 2D kernel corresponding to a particular output channel. In this example, the value of each element of output feature map 430 is computed as follows:

$$[x][y][zout] += activations[x+kx][y+ky][zin] * weights[kx][ky][zin][zout]$$

In the illustrated example, there is one 3D filter 420 for each channel (zout) in Zout. More specifically, the illustrated multi-channel convolution uses four 3D filters 420 to generate elements for each x/y position in each of four output channels, respectively, while sweeping the appropriate 2D kernels across and down the elements of input feature map 410 in each of the input channels. For example, the value of element 432 of output feature map 430 is determined by applying highlighted 3D filter 420-1 to the highlighted portion 412 of input feature map 410, i.e., 36 activations including 9 activations in respective x/y positions in each of 4 input channels zin. Similarly, the value of element 434 of output feature map 430 is determined by applying 3D filter 420-4 to the highlighted portion 412 of input feature map 410.

Traversing input feature map 410 in the x dimension involves sweeping the highlighted portion 412 across the input feature map such that element 414 moves one position to the right to identify a next set of activations for each successive iteration in the x dimension. For example, the value of element 436 of output feature map 430 is determined by applying 3D filter 420-1 to the highlighted portion 412 of input feature map 410 after the highlighted portion has been moved from the initial position in which it is shown in FIG. 4 to a location two positions to the right. Traversing input feature map 410 in the y dimension involves sweeping the highlighted portion 412 across the input feature map such that element 414 moves one position down to identify a next set of activations for each successive iteration in the y dimension. For example, the value of element 438 of output feature map 430 is determined by applying 3D filter 420-1 to the highlighted portion 412 of input feature map 410 after the highlighted portion has been moved from the initial position in which it is shown in FIG. 4 to a location one position down and one position to the right.

Performing the multi-channel convolution illustrated in FIG. 4 involves performing a series of 2D convolutions, as follows:

```
for zout in Zout
  for x in Xout
    for y in Yout
      for kx in KernelX
        for ky in KernelY
          for zin in Zin
            output[x][y][zout] +=
              activations[x + kx][y + ky][zin] * weights[kx][ky][zin][zout]
```

In particular embodiments, the generation of scalar addresses identifying the input and output elements for each 2D convolution is performed by the compiler when generating the tensor instructions that represent the multi-channel convolution. In particular embodiments, the generation of scalar addresses for each of the corresponding input tensors (activation addresses), filter tensors (weight addresses), and output tensor (output address) may be performed in hardware, such as within the ML accelerators described herein, in accordance with the following:

for the activation addresses:

```
for x in Xout
  for y in Yout
    for kx in KernelX
      for ky in KernelY
        for zin in Zin
          activations [x + kx][y + ky] [zin],
for the weight addresses:
  for zout in Zout
    for kx in KernelX
      for ky in Kernel Y
        for zin in Zin
          weights[kx][ky][zin][zout],
```

-continued

```
and for the output address:
    for zout in Zout
        for x in Xout
            for y in Yout
                for zin in Zin
                    outputs[x][y][zout].
```

Figure 5A:
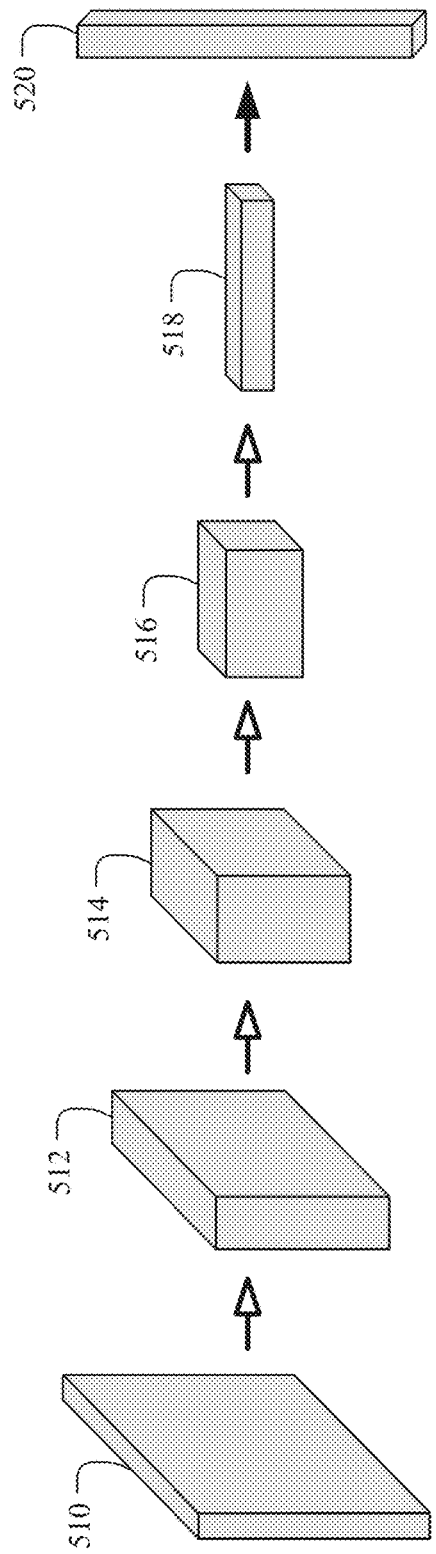
FIG. 5A illustrates an example CNN for a classification-type network.

FIG. 5A illustrates an example convolutional neural network in which an output feature map 520 is generated based on an input feature map 510 in a classification-type neural network. This type of neural network may typically involve a small or medium resolution input, a single vector output, and a relatively large number of output channels. In the illustrated example, intermediate feature maps of different sizes and shapes, shown as feature maps 512, 514, 516 and 518, are generated by performing successive convolution operations on each such intermediate feature map, in turn, and the output feature map 520 is generated by a fully connected (FC) layer operating on the final intermediate feature map 518. As shown in FIG. 5A, it may be typical for the overall size, and corresponding memory requirements, to be reduced for each successive intermediate feature map in a classification-type neural network.

Figure 5B:
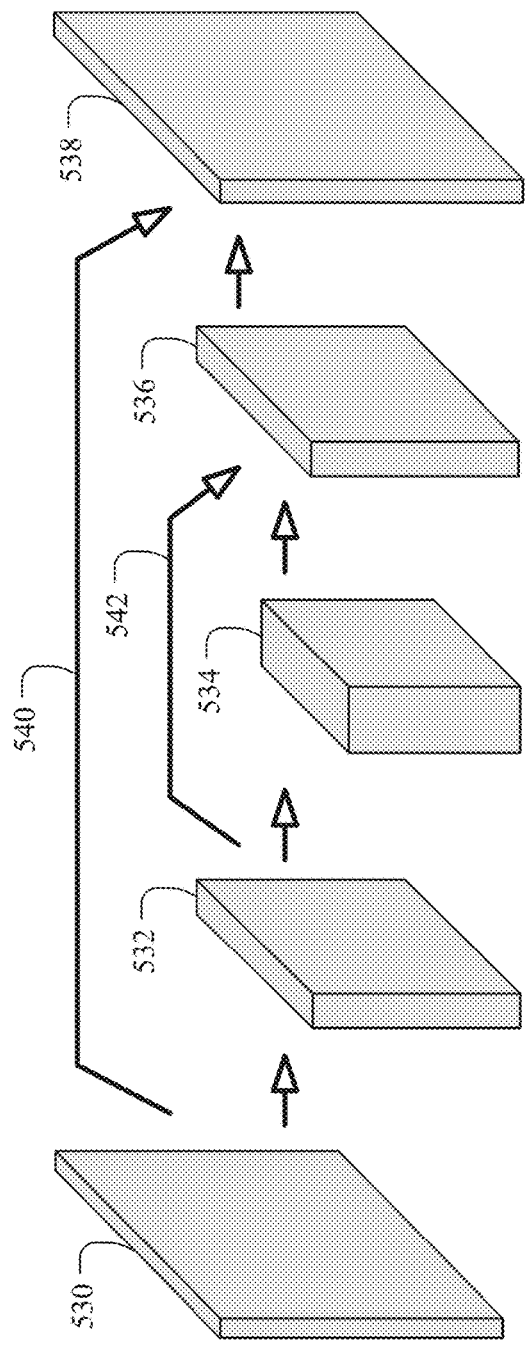
FIG. 5B illustrates an example CNN for a UNet-type network.

FIG. 5B illustrates an example CNN in which an output feature map 538 is generated based on an input feature map 530 in a UNet-type neural network. This type of neural network may involve high resolution input and/or output feature maps and a relatively small number of input and/or output channels. This type of neural network may also involve long skip connections such that a particular intermediate feature map may be dependent not only on the immediately preceding intermediate feature map but also on another previous intermediate feature map. Such skip connections are shown by arrows 540 and 542 in FIG. 5B. In the illustrated example, intermediate feature maps of different sizes and shapes, shown as feature maps 532, 534, and 536, are generated using a series of convolution operations prior to the generation of the output feature map 538. In this example, intermediate feature map 532 is generated based on input feature map 530, intermediate feature map 534 is generated based on intermediate feature map 532, intermediate feature map 536 is generated based on both intermediate feature map 534 and on intermediate feature map 532, and output feature map 538 is generated based on both intermediate feature map 536 and input feature map 530. In particular embodiments, such as in AR/VR applications, the input and output feature maps may have similar sizes and shapes, while the sizes and shapes of the intermediate feature maps may vary widely. For example, in some cases, a particular intermediate feature map may be shorter, narrower, and/or shallower than the preceding feature map(s) from which it was generated, while in other cases, a particular feature map may be taller, wider, and/or deeper than the preceding feature map(s) from which it was generated.

As noted above, in a convolutional neural network, the convolutional layers typically account for the vast majority of the computations performed and the data movement within the CNN and/or between the CNN and other elements of an ML model, making them a performance bottleneck. Therefore, modern CNN accelerators focus on using high compute parallelism along with an optimized data orchestration throughout the memory hierarchy to speed up the processing of convolutional layers. Conventionally, individual tensor processors within a machine learning accelerator may asynchronously perform convolution operations (e.g., multiplication, accumulation, pooling, and the like) on image data or another type of input feature map, or a portion thereof that has been spatially partitioned. However, effectively harnessing the compute power of these accelerators may require the design of a particular mapping scheme that dictates when (i.e., at which processing cycle) and where (i.e., at which compute data path among hundreds to thousands of them) each operation (i.e., each multiply-and-accumulate, or MAC) is performed. The design of such a mapping scheme may, in turn, have an impact on the hardware architecture design, as the hardware would need to be able to deliver data at the right time and in the right format to the right compute data path so that it can be operated on in the right cycle.

The ML accelerators described herein employ a multi-level control architecture designed to optimally exploit parallelism provided by tensor processors in the ML accelerator. These machine learning accelerators may include one or more tensor processor clusters, each of which may include multiple tensor processors. As noted above, each tensor processor may be a single-instruction-multiple-data (SIMD) machine that includes a compute array capable of performing vector operations to implement data parallelism or model parallelism at the tensor processor or tensor processor cluster level. Each tensor processor cluster may include a shared controller that controls and synchronizes the operations of the tensor processors within the cluster so that they perform a common series of operations in parallel and in lockstep. As described in more detail herein, the multi-level control architecture may support more flexibility in parallelism for computations of neural network layers than is possible using existing ML acceleration schemes, while lowering hardware costs due to the physical circuit area and/or power consumed by various tensor instructions. The multi-level apparatus may be used to implement any of a variety of neural network solutions to machine learning problems including, but not limited to, object identification, feature classification, or content-driven image processing. The multi-level apparatus may be particularly well suited for implementation within edge devices that have strict power consumption constraints and that run inference exercises using previously trained models in real time, such as in AR/VR headsets. These and other edge devices may be configured as batchless machine learning computers. For example, they may use machine learning to parallelize the processing of a single image (e.g., in an inference exercise with a batch size of one) rather than to parallelize a training exercise across multiple images of a training set.

Figure 6:
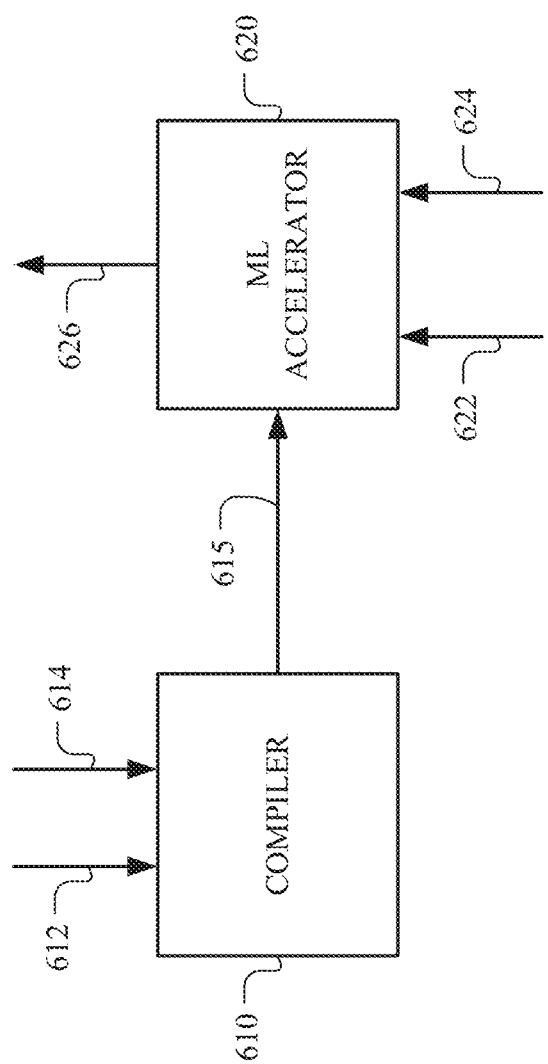
FIG. 6 illustrates selected elements of an example system including a compiler and an ML accelerator.

FIG. 6 illustrates selected elements of an example system including a compiler 610 and an ML accelerator 620. In the illustrated example, compiler 610 generates coarse-grained machine language instructions, shown as tensor instructions 615, based on inputs including programming language instructions 612 and configuration information 614 indicating the configuration of a neural network that is to perform the tensor instructions 615. In this example system, ML accelerator 620 receives the tensor instructions 615 and generates, for input features 622 and applicable weights 624, output features 626. For example, compiler 610 may, in accordance with an instruction set architecture (ISA) that is used to facilitate machine learning processing for a specific hardware architecture, map a single ML operation (such as a convolution operation) to multiple coarse-grained machine language instructions, any or all of which may be multi-dimensional (tensor) instructions. In particular embodiments, a full ML layer may be represented using one or more instructions in each of three classes of hardware instructions:

compute instructions, non-linear (NLU) instructions, and direct memory access (DMA) instructions.

In particular embodiments, the compiler 610 may analyze a workload to be performed by the neural network and determine respective coarse-grained tensor instructions to be sent to each tensor processor cluster of ML accelerator 620 using a SIMD and/or single-program-multiple-data (SPMD) approach to distribute the workload. The compiler 610 may distribute the workload based on the architecture of the neural network, the number of tensor processor clusters, the number and processing capacity of the tensor processors in each tensor processor cluster, the input and output feature dimensions, the number and types of convolutions and other operations to be performed at different layers of the neural network, and/or the relationships between the output features produced at each layer and the input features required at the next layer. The workload distribution decisions may maximize the reuse of locally available feature sets and weights once they are loaded into the memories of particular tensor processors, reduce the amount of data movement required between and within tensor processor clusters, and optimize resource utilization in ML accelerator 620. For example, compiler 610 knows what input features are to be processed by each coarse-grained instruction and determines how they should be partitioned between multiple tensor processor clusters of ML accelerator 620 and the tensor processors thereof. With this information, the compiler may then encode a "recipe" (including vector operations and addressing pattern) to be provided to each cluster to perform the coarse-grained instruction.

Figure 7A:
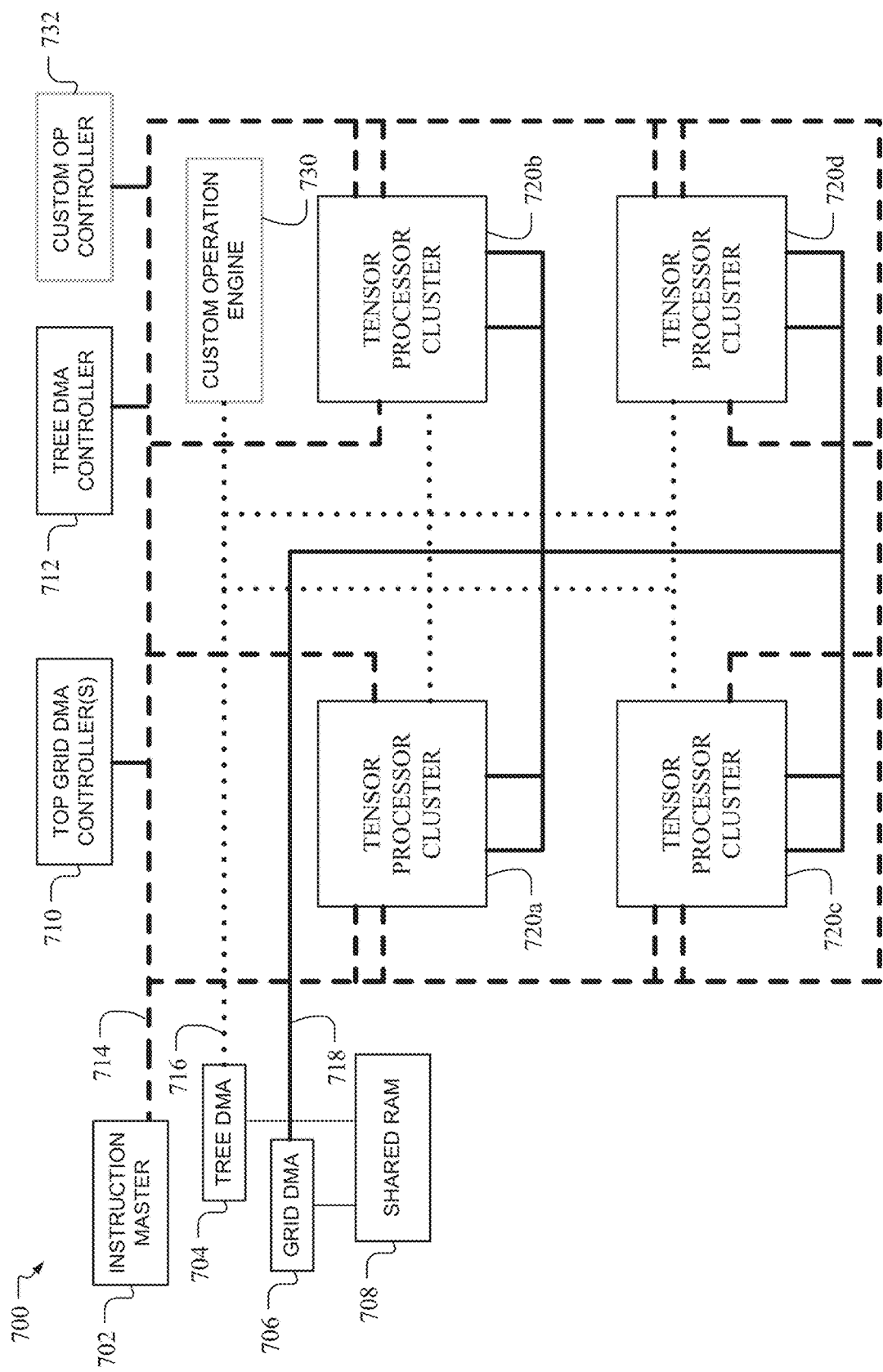
FIG. 7A illustrates selected elements of an example ML accelerator including multiple tensor processor clusters.
Figure 7B:
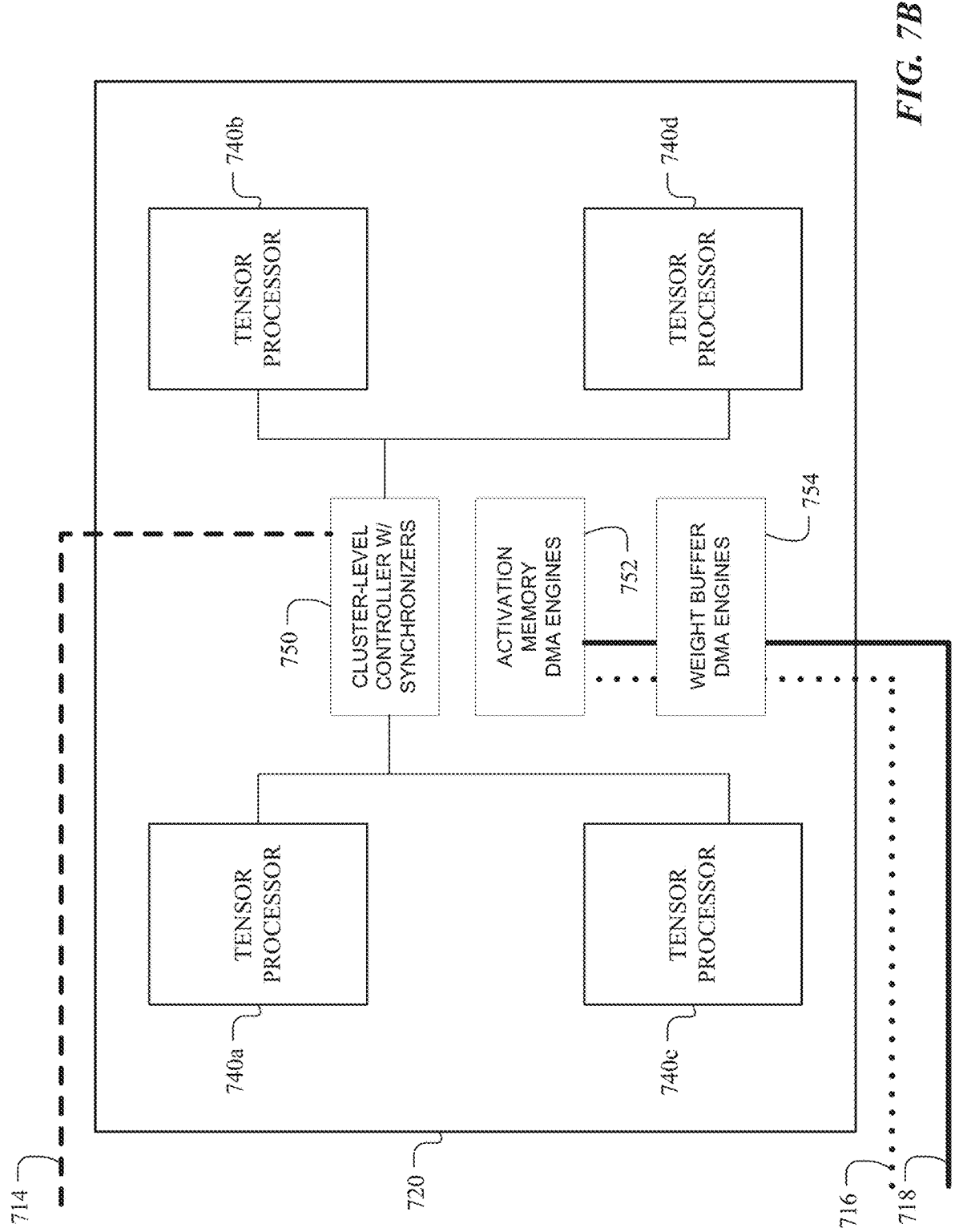
FIG. 7B illustrates selected elements of an example tensor processor cluster.
Figure 7C:
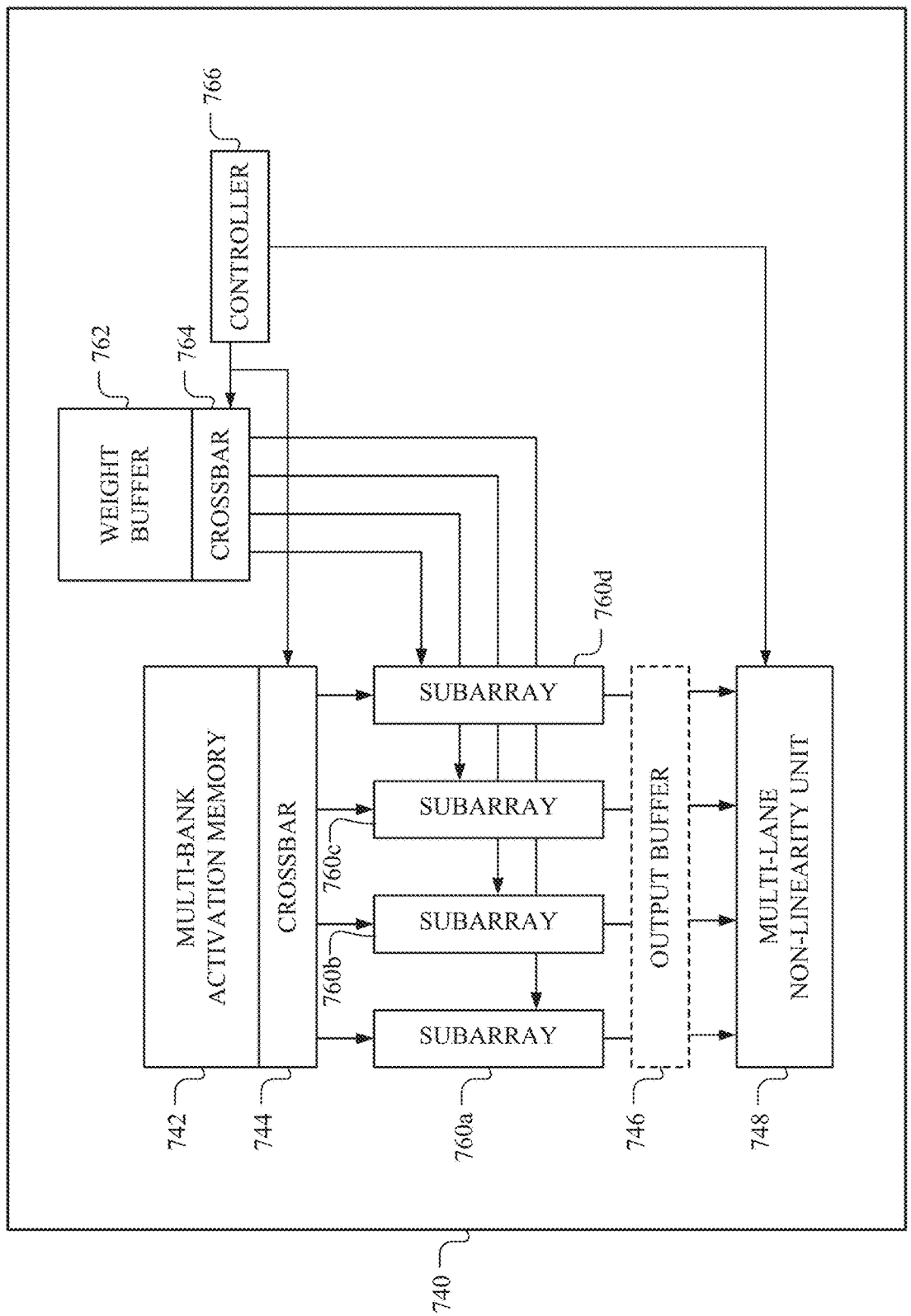
FIG. 7C illustrates selected elements of an example tensor processor.

FIGS. 7A through 7C illustrate selected elements of an example ML accelerator, such as an ML accelerator similar to ML accelerator 620 illustrated in FIG. 6, at different levels of the multi-level accelerator architecture. For example, FIG. 7A illustrates that an example ML accelerator 700 may include four tensor processor clusters 720 and may include, or be communicably coupled to, one or more top grid DMA controllers 710, a tree DMA controller 712, and/or an optional custom operation engine 730 and a corresponding optional custom operation controller 732. In other embodiments, ML accelerator 700 may include more or fewer than four tensor processor clusters 720. ML accelerator 700 may include, or be communicably coupled to, an instruction master 702, which may be communicably coupled to each of the four tensor processor clusters 720, the top grid DMA controllers 710, and the tree DMA controller 712 over an instruction bus 714. ML accelerator 700 may also include a tree DMA 704 and a grid DMA 706, each of which is communicably coupled to a shared RAM 708. Tree DMA 704 may be communicably coupled to each of the four tensor processor clusters 720 and the optional custom operation engine 730 over tree DMA bus 716. Grid DMA 706 may be communicably coupled to each of the four tensor processor clusters 720 over grid DMA bus 718. In at least some embodiments, ML accelerator 700 may also include a synchronization bus communicably coupled to the four tensor processor clusters 720, the top grid DMA controllers 710, the tree DMA controller 712, the optional custom operation engine 730 and corresponding optional custom operation controller 732, the instruction master 702, the tree DMA 704, the grid DMA 706, and/or the shared RAM 708, or any suitable subset thereof (not shown in FIG. 7A).

To support multiple tensor processor clusters processing input features in parallel, tree DMA controller 712 may distribute neural network weights (e.g., in packets) to tensor processor clusters 720 via tree DMA bus 716. The network topology in which the tree DMA controller 712 is communicatively coupled to each of the tensor processor clusters 720 may allow each tensor processor within a tensor processor cluster 720 to be communicatively coupled to the tree DMA controller 712 via a respective sub-branch of the tree DMA bus 716. Similarly, one or more top grid DMA controllers 710 may distribute activations to tensor processor clusters 720 via grid DMA bus 718. The network topology in which the grid DMA controller 710 is communicatively coupled to each of the tensor processor clusters 720 may allow each tensor processor within a tensor processor cluster 720 to be communicatively coupled to the grid DMA controller 710 via a respective sub-branch of the grid DMA bus 718. By structuring the tree DMA bus 716 and the grid DMA bus 718 according to a tree network topology (e.g., rather than a star or ring topology), the corresponding DMA controllers 712 and 710 may distribute neural network weights and activations to each tensor processor cluster 720 directly, thereby minimizing latency and overall power consumption. As such, the machine learning accelerator 700 may be suitable for AR/VR applications or other applications that require feature processing with minimal latency within a finite power budget.

FIG. 7B illustrates selected elements of an example tensor processor cluster 720, such as one of the four tensor processor clusters 720 of ML accelerator 700 illustrated in FIG. 7A. In this example, tensor processor cluster 720 includes four tensor processors 740, a shared cluster-level controller 750, one or more activation memory DMA engines 752, and one or more weight buffer DMA engines 754. In other embodiments, tensor processor cluster 720 may include more or fewer than four tensor processors 740. An example tensor processor 740 is illustrated in FIG. 7C and described below. The shared cluster-level controller 750 may interpret each coarse-grained tensor instruction received from a compiler, such as compiler 610 illustrated in FIG. 6, and translate it into a series of fine-grained tensor instructions that are multicast to the tensor processors in the tensor processor cluster tasked with performing the common series of operations. Each of these fine-grained tensor instructions may, for example, be a machine language instruction that represents a vector read operation, a vector write operation, a vector addition operation, or a vector multiplication operation to be performed by hardware compute arrays within each tensor processor or may represent a non-linear instruction to be applied to an intermediate output of the hardware compute arrays to produce an element of an output feature set. The shared cluster-level controller 750 may include synchronizers that synchronize the operations of the tensor processors within the cluster so that they perform the common series of operations in parallel and in lockstep. For example, one or more synchronizers may maintain the state of the control loops across all tensor processors to ensure there are no data hazards between producers and consumers of particular features. The shared cluster-level controller 750 may ensure that the appropriate subsets of the input feature set and the weights to be applied for that operation have been loaded into the local memories for each tensor processor. This may include generating an address pattern for the weights, generating an address pattern for the input activations, and generating an address pattern for the outputs of the common series of operations.

The cluster-level controller 750 receives tensor instructions, e.g., coarse-grained tensor instructions, over instruction bus 714. Each coarse-grained tensor instruction sent to a tensor processor cluster 620 may encode information usable by the cluster to perform a multi-cycle operation corresponding to a part of a single neural network layer. For example, compiler 610 may generate a respective "recipe" for each layer in a convolutional neural network. In one example, using a SPMD approach, the compiler 610 may distribute the workload such that different tasks are assigned to different tensor processor clusters 620 with some or all of the tensor processor clusters 620 operating on the same input feature set. Using this approach, the tensor processor clusters 620 may operate in parallel but may typically not operate in lockstep with each other. In another example, using a SIMD approach, the compiler 610 may distribute the workload such that the same tasks are assigned to multiple tensor processor clusters 620 and such that each of those multiple tensor processor clusters 620 operates on different data, such as on a different subset of an input feature set for the neural network. In one example, the compiler 610 may assign one quarter of an input feature set representing an image to each of four tensor processor clusters 620 for processing, and each of the four tensor processors 740 in each tensor cluster 620 may operate on one-quarter of the input features allocated to the tensor processor cluster 620 by the compiler. Using this approach, the tensor processor clusters 620 may operate in parallel and may typically, but not necessarily, operate in lockstep with each other. By contrast, within a tensor processor cluster 620, the operations of the tensor processors 740 of the cluster may always be performed in parallel and in lockstep.

In particular embodiments, the activation memory DMA engines 752 and weight buffer DMA engines 754 are communicably coupled to a grid DMA and a tree DMA, such as those illustrated in FIG. 7A, over grid DMA bus 718 and tree DMA bus 716, respectively, to provide the appropriate weights and input features to each tensor processor 740 in each cycle. In the example tensor processor cluster 620, each of the four tensor processors 740 may operate on one-quarter of the input features allocated to tensor processor cluster 620 by the compiler, as provided by the activation memory DMA engines 752. In particular embodiments, activation memory DMA engines 752 and the synchronizers within cluster-level controller 750 may make it possible to share edge pixels between layers. For example, activation memory DMA engines 752 may be coupled with the synchronizers to help move output edge pixels from the activation memories of particular tensor processors 740 to the activation memories of other tensor processors 740 for computing the next layer output. In some cases, such as when the dimensions of the output feature map are different than the dimensions of the input feature map for the next layer, each tensor processor may require output features generated by more than one tensor processor as input features for computing the next layer output. In particular embodiments, the synchronizers may schedule DMA operations to move the data based on information encoded in the multi-cycle instructions by the compiler and received by cluster-level controller 750.

Because the tensor processors within a given tensor processor operate in parallel and lock step to perform the same sequence of vector operations in accordance with a common recipe, each tensor processor may be configured to perform the same amount of work. However, the amount of work to be done, collectively, by the tensor processors might not be divisible across the tensor processors in a way that utilizes all of the available computing resources in the tensor processors. In particular embodiments, the compiler may "round up" the amount of work allocated to each tensor processor cluster to match the number and dimensions of the tensor processors and MAC computation units thereof, such as by zero padding the spatial partition of the input feature map provided to the cluster to maintain symmetry between the tensor processors. The zero padding may be applied by the complier at different levels of the multi-level control architecture, in different embodiments. In one example, if a given cluster is to compute a 3×3 output tensor and the cluster includes four tensor processors, the compiler may apply zero padding to the respective spatial partition of the input tensor assigned to the cluster in the x and y dimensions such that the computation generates a 4×4 output tensor that is divisible across the four tensor processors, portions of which may be discarded or ignored. In another example, zero padding may be applied at a lower level of the multi-level control architecture. For example, a particular tensor processor may be configured to generate outputs in 32 channels, but the convolution operation to be performed by the tensor processor may produce an output tensor having only 30 channels. In this example, the compiler may apply zero padding to expand the dimensions of the computation to match the dimensions of the output tensor.

Convolutional neural networks (CNNs) used in end-user applications (e.g., AR/VR applications) typically need to support input and output feature maps with a wide variety of shapes and sizes, especially along the channel dimension. The tensor processors described in this application address this diversity using flexible hardware resources and flexible computation-to-hardware mapping. For example, FIG. 7C illustrates selected elements of an example tensor processor 740, such as one of the four tensor processors 740 of tensor processor cluster 720 illustrated in FIG. 7B. In particular embodiments, tensor processor 740 is implemented with a flexible architecture in which computation components are organized such that the tensor processor can support a variety of convolutional layer shapes with high resource utilization and high reuse of locally available data. The tensor processor 740 may be a single-instruction-multiple-data (SIMD) machine that includes a compute array capable of performing vector operations that collectively implement higher-level tensor instructions using data parallelism or model parallelism in a neural network. In this example, tensor processor 740 includes a multi-bank activation memory 742, a first crossbar 744, four compute subarrays 760, an optional output buffer 746, a multi-lane non-linearity unit 748, a weight buffer 762, e.g., a register file storing weights, a second crossbar 764, and a local controller 766. In particular embodiments, tensor processor 740 may, during operation, be dynamically configured to perform convolution operations of different sizes and shapes by controlling the size and shape of the input feature map data and weights supplied to each of the subarrays 760 and MAC computation units thereof using the flexible crossbars 744 and 764 and by controlling the reduction and/or combination of the outputs of each of the subarrays 760 and MAC computation units thereof to generate an output feature map of a desired size and shape.

As described in more detail below, in at least some embodiments, the number of convolution operations that can be performed by a tensor processor 740 in parallel during a single cycle, and the input feature map data and weights supplied to each of the subarrays 760 and MAC computation units thereof for a single cycle, may be dependent on the relative sizes of the input tensor dimensions, the output tensor dimensions, and/or the width of the subarrays 740. For example, if the number of input tensor channels and/or the number of output tensor channels is small compared to the subarray width or another indicator of the computational capacity of each of the subarrays 760, the tensor processor 740 may be dynamically configurable to compute multiple output tensor vectors corresponding to multiple input tensor vectors in a single cycle. In particular embodiments, tensor processor 740 may also be configured to perform grouped convolution operations in which not all output elements depend on the same input elements or weights.

In the illustrated example, multi-bank activation memory 742 includes local memory elements that store the input feature map elements to be provided to various ones of the subarrays 760. The first crossbar 744 is a first flexible many-to-many crossbar that reads input feature map elements (e.g., pixel values) from multi-bank activation memory 742 and provides them to the appropriate subarrays 760 in each cycle. In the illustrated example, weight buffer 762, which may be implemented as a register file, includes local memory elements that store the filter weights to be provided to various ones of the subarrays 760. The second crossbar 764 is another flexible crossbar that loads filter weights from weight buffer 762 and provides them to the appropriate subarrays 760 in each cycle. In particular embodiments, results of the operations (e.g., output feature elements) may be written back into multi-bank activation memory 742 from which they may be provided as inputs to various subarrays 760 of the same tensor processor 740 or a different tensor processor 740 in a subsequent cycle (e.g., for a different layer in the convolutional neural network) and/or for a subsequent vector operation of current cycle. In other words, activation memory 742 may be a shared memory that, at various times, stores input activations and/or output activations associated with various convolution operations that have been performed by, or are to be performed by, the subarrays 760 of the tensor processor 740. As discussed above in reference to activation memory DMA engines 752, the output feature set for a given layer might have different dimensions and/or be distributed differently than the input feature set for the next layer. In particular embodiments, the merging of results generated by the subarrays 760 may be performed in the shared memory.

In particular embodiments, each of the four compute subarrays 760 includes an array of multiply-and-accumulate (MAC) computation units of a given size that operate in parallel to apply the weights defined for a given 2D kernel of a given 3D convolution filter to portions of an input feature map and produce portions of an output feature map. In one example, each of the four compute subarrays 760 may include 64 MAC computation units organized as an 8×8 array, for a total of 256 MAC computation units in tensor processor 740. In this example, each of the four compute subarrays 760 may produce 8 output feature elements, for a total of 32 output feature elements produced by tensor processor 740. In other embodiments, the subarrays 760 of a particular tensor processor 740 may include more or fewer than 64 MAC computation units organized as 2D arrays of a size other than 8×8. The output feature map may have a different shape than the input feature map. A local controller 766 within tensor processor 740 may, e.g., in conjunction with a shared cluster-level controller, such as shared cluster-level controller 750 illustrated in FIG. 7B, control the operation of the crossbars 744 and 764 and the flexible reduction module or multi-lane non-linearity unit 748, in accordance with the coarse-grained tensor instructions received from compiler 610 illustrated in FIG. 6 and/or fine-grained instructions received from the shared cluster-level controller 750.

In particular embodiments, the optional output buffer 746 stores intermediate outputs from one or more subarrays 760 such that partial results may be accumulated prior to passing them through a reduction module, thus reducing the scope and/or complexity of the reduction operation. In particular embodiments, the multi-lane non-linearity unit 748 is a flexible reduction module configurable to take an intermediate computation output from the subarrays 760 and perform a reduction (i.e., addition) of subarray outputs to produce an output for tensor processor 740 as a whole, where appropriate. In this example, the tensor processor 740 would not only perform the MAC operations of a given convolution operation, but may also execute non-linear instructions, as needed, for the particular machine learning program. In one example, the non-linearity unit 748 may apply functions such as Relu to the sum of the outputs of multiple subarrays 760 and write the result into the shared multi-bank activation memory 742.

Each of the coarse-grained tensor instructions received by a tensor processor cluster may encode information usable by its shared controller to determine the subset of the input feature set on which each tensor processor within the cluster is to operate (each tensor processor being tasked with generating an assigned spatial partition of the output tensor based on the assigned subset of input feature set), the common series of operations to be performed by all of the tensor processors within the cluster, the weights to be applied to the subset of the input feature set for each of the operations within the common series of operations, and any non-linear operations that are to be applied to the subset of the input feature set as part of a multi-cycle operation corresponding to a single neural network layer. For example, the computations for generating the next-layer output may be spatially partitioned equally across a 2D array of tensor processors within the tensor processor cluster in the x and y dimensions.

The tensor processor may perform a convolution operation using a 3D filter where the movement of the filter over the input feature map is relative to the x-y locations of each pixel of the input feature map in two dimensions. In one example, a coarse-grained, multi-cycle tensor instruction may represent a nested loop that iterates over x, y, and channel dimensions of an input feature map to produce an output feature map having the same or different dimensions as the input feature map.

In at least some embodiments, when a tensor processor cluster implements data parallelism, all of the tensor processors within the cluster may perform the same common series of operations using the same weights, but each tensor processor in the cluster may operate on a different subset of the input feature set to produce a subset of an output feature set having the same output format and output dimensions. Using this approach, the fine-grained machine language instructions broadcast to all tensor processors in the cluster may be the same and they may access and apply the same sets of weights at each step. The fine-grained machine language instructions may be expressed in terms of addresses relative to particular base addresses in one or more dimensions and these base addresses may be different from each other to identify the appropriate subsets of the input feature set on which each tensor processor is to operate.

In at least some embodiments, when a tensor processor cluster implements model parallelism, all of the tensor processors within the cluster may perform the same common series of operations on the same subset of the input feature set, but each of the tensor processors in the cluster may apply a different set of weights to those operations to produce a respective subset of an output feature set. Using this approach, the fine-grained machine language instructions broadcast to all tensor processors in the cluster may be the same and they may access and operate on the same subset of the input feature set but, at each step, each tensor processor may access and apply a different set of weights than the other tensor processors in the cluster.

Before broadcasting a fine-grained tensor instruction corresponding to one of the operations in the common series of operations to be performed by the tensor processors within a tensor processor cluster, the shared controller of the tensor processor cluster may ensure that the appropriate subsets of the input feature set and the weights to be applied for that operation have been loaded into the local memories for each tensor processor. This may include loading multiple sets of weights to be applied by respective operations in the common series of operations prior to initiating the operation of the first of the operations in the series. Once all of the tensor processors have local access to their respective subsets of the input feature set and the appropriate weights to be applied, the shared controller may broadcast the fine-grained machine language instruction for the upcoming operation. Similarly, before initiating the performance of a second common series of operations corresponding to a second coarse-grained tensor instruction, the shared controller may ensure that the appropriate subsets of the input feature set and the weights to be applied by the operations in the second common series of operations have been loaded into the local memories for each tensor processor. In some embodiments, the output tensor data produced by one convolution operation, e.g., for one convolution layer, is the input tensor data for a subsequent convolution operation or layer. Therefore, ensuring that the appropriate subsets of the input feature set and the weights to be applied by the operations in the second common series of operations have been loaded into the local memories may include initiating one or more direct memory access (DMA) transfers between the memories in multiple tensor processors within the cluster if performing the second common series of operations necessitates the redistribution of elements of the subsets of the output feature set produced by the tensor processors in the previous operation to serve as appropriate subsets of an input feature set for the upcoming operations, such as when the dimensions of the input feature set for the second common series of operations are different than the dimensions of the output feature set produced by the previous common series of operations.

As noted above, in particular embodiments, tensor processor 740 may, during operation, be dynamically configured to perform convolution operations of different sizes and shapes by controlling the size and shape of the input feature map data and weights supplied to each of the subarrays 760 and MAC computation units thereof using the flexible crossbars 744 and 764 and by controlling the reduction and/or combination of the outputs of each of the subarrays 760 and MAC computation units thereof to generate an output feature map of a desired size and shape.

In many applications, the input tensor data may be organized such that data elements having the same values in the N, H, and W dimensions but different values in the C dimension are contiguous in the memory. In such applications, each vector read operation may read contiguous activations from the activation memory that have the same values in the N, H, and W dimensions but different values in the C dimension.

Figure 8:
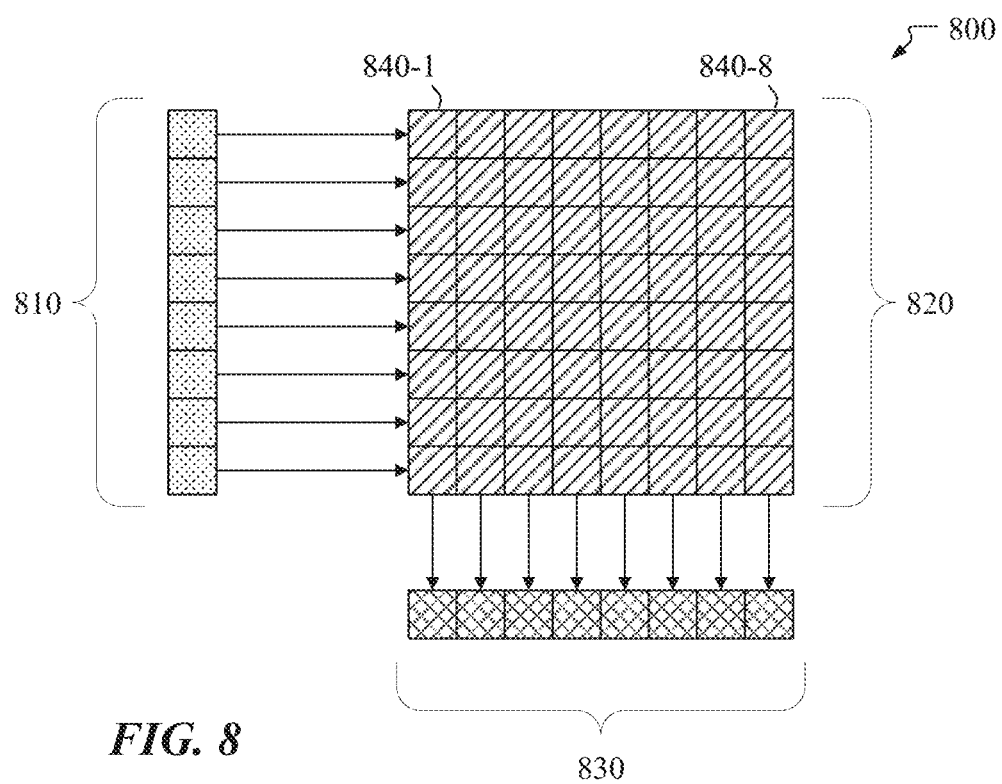
FIG. 8 illustrates an example convolution in which the size of the input tensor in the channel dimension is equal to 8 and in which each subarray of the compute array is an 8×8 subarray of MAC computation units.

FIG. 8 illustrates an example convolution in which the size of the input tensor in the channel dimension, C, is equal to 8 and in which each subarray of the compute array, such as subarray 800, is an 8×8 subarray of MAC computation units. In this example, the convolution is parallelized along the channel dimension of the input tensor. In this example, each vector read operation on contiguous addresses in the activation memory fetches 8 activations, each of which may be provided to a respective one of the 8 rows of MAC computation units 820 to perform computations using an 8×8 array of weights to produce an 8-element output vector 830. More specifically, FIG. 8 illustrates that a vector read operation has fetched an 8-element input vector of activations 810. The weights applied in each column 840 of the 8×8 subarray of MAC computation units correspond to a single one of multiple 3D filters having a particular value in the K dimension, such that the weights applied in the first column come from a first 3D filter with a first value in the K dimension, the weights applied in the second column come from a second 3D filter with a second value in the K dimension, and so on. The weights applied on each row of subarray 800 correspond to a single one of multiple channels of the filter tensor, where the size of the filter tensor in the channel dimension is equal to the size of the input tensor in the channel dimension. In this example, the size of vector read operations along the C dimension corresponds to the height of subarray 800, leading to an efficient use of the compute resources in the 8×8 subarray of MAC computation units.

The relative sizes and shapes of the input tensors and output tensors of a CNN in different dimensions may vary for different applications and/or for each intermediate layer within the CNN. For example, in some applications, including some AR/VR applications, the input to the first layer of the CNN may be a tensor with a single channel (e.g., C=1). In ML accelerators in which vector read operations directed to the activation memory are always and only performed along the C dimension, this may result in a substantial reduction in the utilization of the compute resources.

Unlike some existing accelerators that add instructions to reorder and/or pad inputs to fit a fixed assumption of the configuration of the input tensor, in the systems described herein, the compiler may generate different instructions and addressing pattern recipes depending on the configuration of the input tensor. For example, the compiler may receive program instructions including one or more nested loops that iterate over multiple dimensions of an input feature map to produce an output feature map having the same or different dimensions as the input feature map and may generate instructions and addressing patterns for performing the nested loop or loops in a convolutional neural network implemented using the ML accelerators described herein. Because the compiler will know the dimensions of the input tensor, based on the received program instructions, the compiler may determine the input tensor dimension along which to parallelize the convolution operations required to perform the nested loop or loops. As described in more detail herein, after determining the appropriate parallelization dimension, the compiler may generate instructions executable for storing activation elements in memory such that elements having different values in the determined parallelization dimension, but the same values in one or more other dimensions, are stored contiguously in the memory. The compiler may also generate instructions for retrieving the activation elements, for providing them to various subarrays of computation units, and for operating on them using particular vector operations while applying appropriate filter weights. This may include generating an addressing pattern indicating the incremental difference between addresses at which consecutive vector read operations fetch data. For example, while consecutive vector read operations may typically fetch data from addresses that are incremented by the vector read size, in some embodiments and under certain circumstances, the incremental difference between addresses at which consecutive vector read operations fetch data, i.e., the granularity at which vectors of input activations are read, may be less than the vector read size.

In addition, the compiler may determine a pattern of weights to be provided to various ones of the subarrays that correspond to the chosen pattern of activations to be operated on by those subarrays. This may include the compiler generating instructions to apply zero padding (e.g., values of zero) in place of filter weight values to some computation units, or rows thereof, within particular tensor processors or subarrays. For example, the compiler may organize the weights or other parameters to match the particular convolution shape for each cycle of a multi-cycle instructions and/or for each layer of a CNN. In some embodiments, the compiler may generate instructions to pre-pad some filter weight values with zeros prior to loading the filter weight values in the weight buffers of particular tensor processors. In other embodiments, the compiler may generate instructions that cause the tensor processor hardware (e.g., second crossbar 764 illustrated in FIG. 7C) to replace some filter weight values with zeros when loading the filter weight values in the weight buffers.

Figure 9:
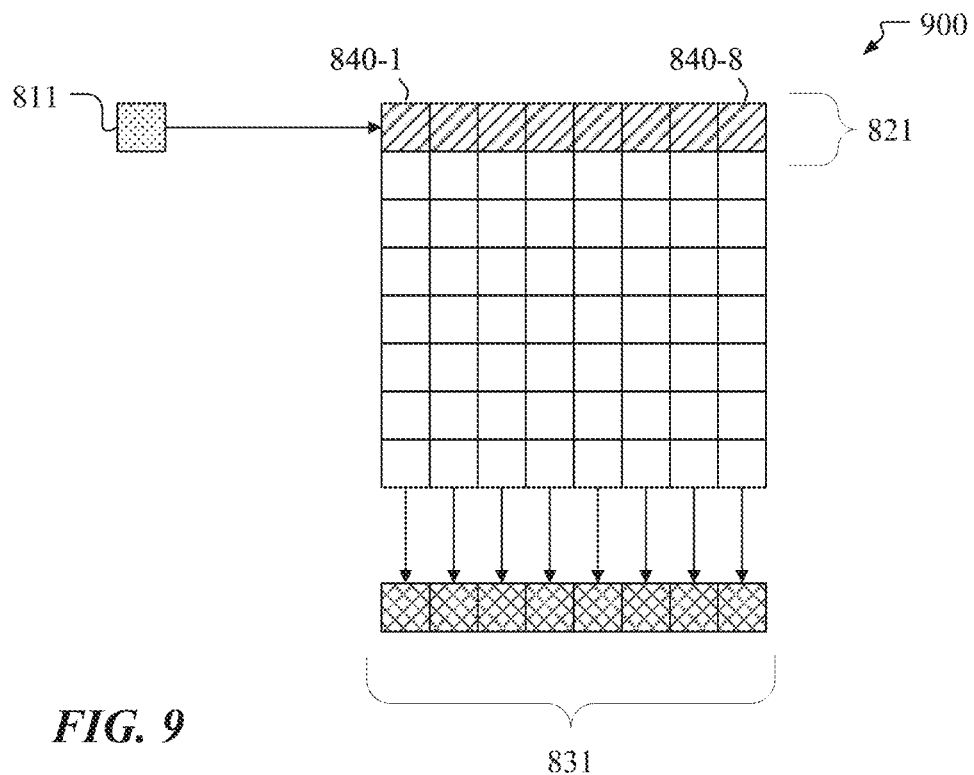
FIG. 9 illustrates an example convolution in which the size of the input tensor in the channel dimension is equal to 1 and in which each subarray of the compute array is an 8×8 subarray of MAC computation units.

FIG. 9 illustrates an example convolution in which the size of the input tensor in the channel dimension, C, is equal to 1 and in which each subarray of the compute array, such as subarray 900, is an 8×8 subarray of MAC computation units. As in the previous example, the convolution is parallelized along the channel dimension of the input tensor. In this example, each vector read operation may be operable to fetch 8 activations at contiguous addresses in the activation memory. However, because the convolution is parallelized along the channel dimension, only a single element of this input vector, shown as activation 811, is provided to a single row 821 of the 8 rows of MAC computation units to perform computations and produce an 8-element output vector 831, reducing the effective vector read size equal to 1. In this example, the weights in each column 840 of the 8×8 subarray of MAC computation units correspond to a single one of multiple 3D filters having a particular value in the K dimension, such that the weights applied in the first column come from a first 3D filter with a first value in the K dimension, the weights applied in the second column come from a second 3D filter with a second value in the K dimension, and so on. However, because there is only one channel in the filter kernel to match the single channel in the input tensor, only the first row of weights is used in the computation. In this example, because the effective size of the vector read operation along the C dimension is equal to 1, at most one-eighth of the resources of subarray 900 may be utilized in each cycle.

In existing ML accelerators, if the size of the input tensor in the channel dimension, C, is greater than 1 but is significantly less than the common height of the subarrays, and if the tensor data is organized in the activation memory so that data elements with different values in the C dimension are not contiguous, it may be difficult to achieve high hardware utilization. In at least some embodiments, the tensor processors and corresponding compilers disclosed herein may addresses these situations by allowing the utilization of the MAC computation units within each subarray of the compute array of a tensor processor to vary based on the configuration of the input data. For example, if the input tensor data is not organized along the C dimension, but along the W dimension, the compiler may generate instructions that take advantage of the data layout to read a vector of contiguous input activations from the activation memory that have a single channel, that have the same values in the H and N dimensions, but that have different values in the W dimension, and to perform computations on them in parallel using respective rows of MAC computation units in a given subarray. In this case, the compiler may also reorder the weights that are to be provided to each MAC computation unit and/or adjust the instructions for generating the addresses for accessing those weights in the local buffer of filter weights. The number of rows of MAC computation units utilized in the given subarray may be equal to the width (S) of the filter kernels and the weights applied in each column of MAC computation units may correspond to kernels having different values in the S dimension.

Figure 10:
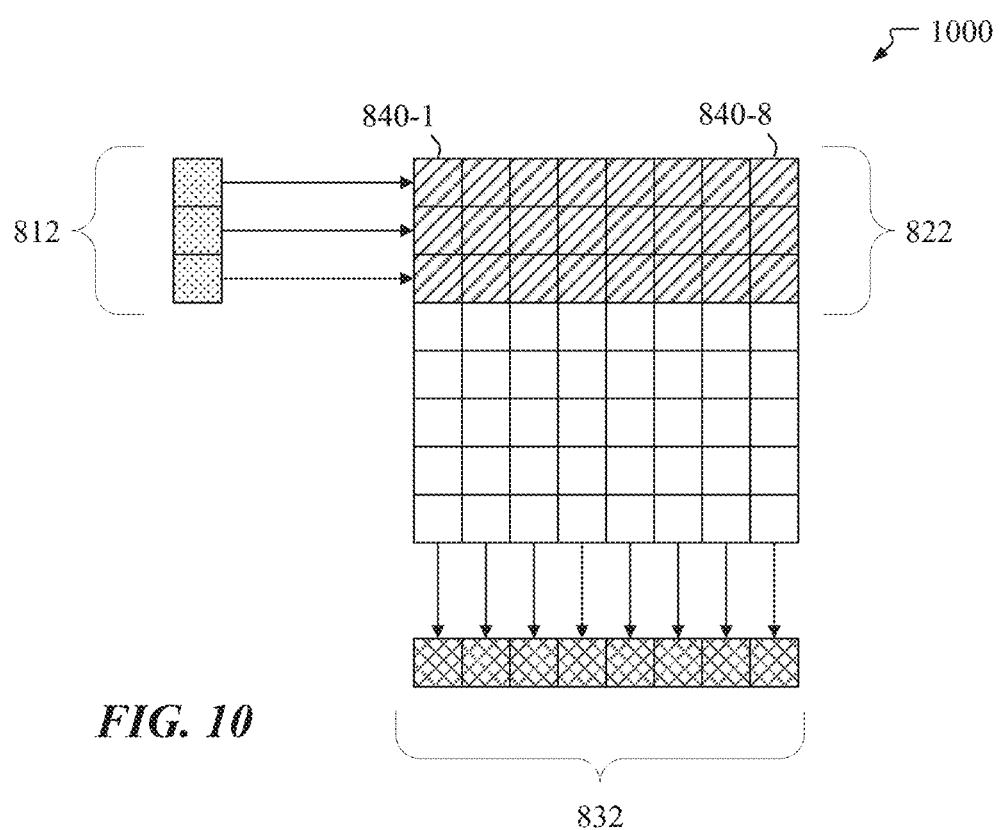
FIG. 10 illustrates an example convolution in which the size of the input tensor in the channel dimension is equal to 1, the size of the input tensor in the width dimension is equal to 3, and each subarray of the compute array is an 8×8 subarray of MAC computation units.

FIG. 10 illustrates an example convolution in which the size of the input tensor in the channel dimension, C, is equal to 1, the size of the input tensor in the width dimension, W, which is equal to the width of the filter tensor applied to the input tensor, S, is equal to 3, and each subarray of the compute array, such as subarray 1000, is an 8×8 subarray of MAC computation units. Note that in practice, the size of the input tensor in the width dimension, W, may typically be much larger than the width of the filter tensor, S. In that case, a subset of 8 elements in the W dimension may be fetched to different rows of the 8×8 array. However, only the first 3 rows may be used to perform useful computations using the weights from the S dimension of the filter tensor, while the remaining 5 rows may be padded with zeros. In the illustrated example, activation elements are stored in the activation memory such that elements having the same values in the N, H, and C dimensions (where there is only a single channel) but different values in the W dimension are stored contiguously, and the size of the input tensor in the width dimension is less than the height of the subarray 1000. Therefore, the convolution is parallelized along the width dimension of the input tensor. In this example, each vector read operation may be operable to fetch 8 activations at contiguous addresses in the activation memory. Unlike in the example illustrated in FIG. 9, because the convolution is parallelized along the width dimension, three elements of this input vector, shown as activations 812, are provided to respective ones of three rows 822 of the 8 rows of MAC computation units to perform computations and produce an 8-element output vector 832, increasing the effective vector read size to 3. Again, note that, in some embodiments, 8 elements of the input tensor may be fetched, even if only 3 are used to perform useful computations. In this example, the three activation elements of input vector 812 have the same values in the N, H, and C dimensions (where there is only a single channel) but different values in the W dimension. As in previous examples, the weights in each column 840 of the 8×8 subarray of MAC computation units correspond to a single one of multiple 3D filters having a particular value in the K dimension, such that the weights applied in the first column come from a first 3D filter with a first value in the K dimension, the weights applied in the second column come from a second 3D filter with a second value in the K dimension, and so on, and three rows of weights are used in the computation. The weights applied on each row of subarray 1000 have the same values in the channel dimension (where C is always equal to 1), but different values in the S dimension. In this example, the utilization of the resources of subarray 1000 in each cycle is significantly improved over that of the example convolution illustrated in FIG. 9.

While in the example illustrated in FIG. 9, the input tensor data is organized, and subsequently processed, along the width dimension, in other embodiments, the input tensor data may be organized, and subsequently processed, along a different dimension, such as the width dimension. In addition, while in several examples described herein the innermost dimension of an input tensor and a corresponding convolution performed on that input tensor is referred to, or is assumed to be, a channel dimension, the techniques described herein are more generally applicable for ML acceleration involving multi-dimensional input tensors in which the dimensions are arbitrarily designated using labels such "channel", "width", "height", "bath", "innermost", "outermost", or other labels.

Figure 11:
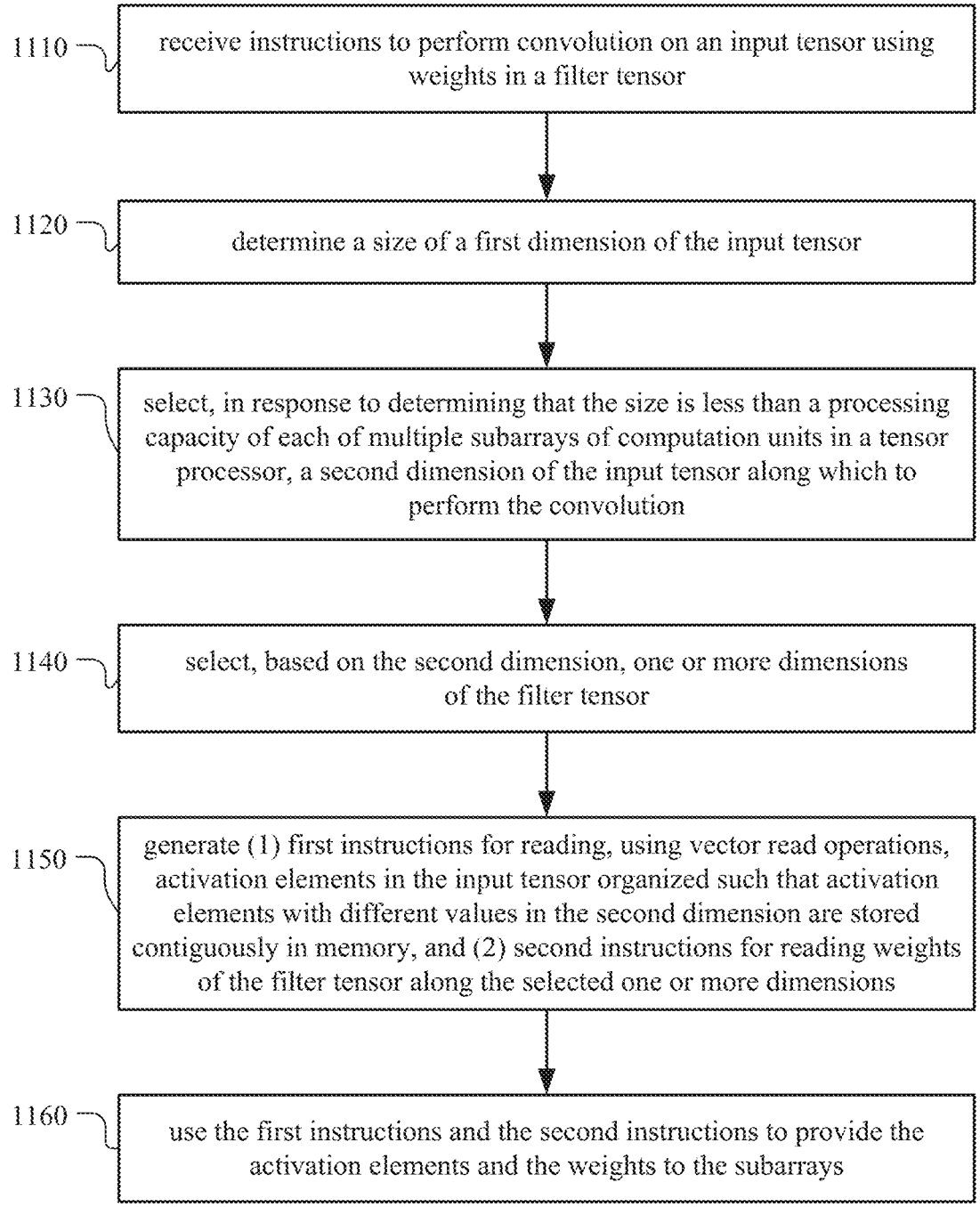
FIG. 11 illustrates an example method for machine learning acceleration that supports flexible compute array utilization in a tensor processor.

FIG. 11 illustrates an example method 1100 for machine learning acceleration that supports flexible compute array utilization in a tensor processor. In various embodiments, some or all of the operations shown in FIG. 11 may be performed by a compiler, such as compiler 610 illustrated in FIG. 6. The method may begin at step 1110, with receiving instructions to perform convolution on an input tensor using weights in a filter tensor. In some embodiments, the compiler may receive programming language instructions of computer programs for machine learning applications that use a convolutional neural network and may translate them into tensor instructions for execution by various computational elements of a ML accelerator, such ML accelerator 620 illustrated in FIG. 6 or ML accelerator 700 illustrated in FIG. 7A and described herein. For example, the compiler may receive program instructions including one or more nested loops that iterate over multiple dimensions of an input feature map to produce an output feature map having the same or different dimensions as the input feature map and may generate instructions and addressing patterns for performing the nested loop or loops in a convolutional neural network implemented using the ML accelerators described herein.

At step 1120, the method may include determining the size of a first dimension of the input tensor. For example, in at least some embodiments, the compiler may determine, based on the received program instructions, the size of the input tensor in the channel dimension. In other embodiments, the compiler may determine the size of the input tensor in the width or height dimension. In some embodiments, the size of the input tensor in the channel dimension may be equal to 1.

At step 1130, method 1100 may include selecting, in response to determining that the size of the input tensor in the first dimension is less than a processing capacity of each of multiple subarrays of computation units in a tensor processor, a second dimension of the input tensor along which to perform the convolution. For example, if the size of the input tensor in the first dimension is less than the common height of the 2D subarrays of MAC computation units in the tensor processors performing the convolution, the compiler may select either the width dimension or the height dimension as the dimension along which to parallelize the convolution in the ML accelerator.

At step 1140, the method may include selecting, based on the second dimension, one or more dimensions of the filter tensor. For example, if the size of the input tensor in the channel dimension is equal to 1, the size of the filter tensor in the channel dimension may also be equal to 1, and the selected one or more dimensions may include the width dimension, the height dimension, or both, depending on the size and shape of the filter tensor in those dimensions. In this example, the weights of the filter tensor may be organized in the respective weight buffers of the tensor processor such that weights provided to respective rows of MAC computation units in each subarray are applicable to the activation elements to be processed by those rows, with the weights being parallelized in the MAC arrays along the one or more selected dimensions of the filter tensor.

At step 1150, method 1100 may include generating (1) first instructions for reading, using vector read operations, activation elements in the input tensor, the activation elements being organized such that activation elements with different values in the second dimension are stored contiguously in memory, and (2) second instructions for reading weights of the filter tensor along the selected one or more dimensions.

At step 1160, the method may include using the first instructions and the second instructions to provide the activation elements and the weights to the subarrays for processing, as described herein.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11, which may include all, some, or none of the steps of the method of FIG. 11, where appropriate, occurring in any suitable order. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

In at least some embodiments, the hardware of the tensor processors described herein may support addressing modes in which vector reads target tensor data with a granularity less than the default vector read size and/or may support shift operations with a granularity less than the default vector read size. For example, various multiplexers within the activation memory, such as activation memory 742 illustrated in FIG. 7C may, in conjunction with crossbar 744, be controllable to perform consecutive vector read operations in which overlapping vectors of activation elements are fetched on address boundaries having a granularity less than the default vector read size. In other words, while each vector read and vector write operation may involve a fixed-sized vector, they might not read or write those vectors at addresses on a fixed-sized address boundary. For example, if the vector read size is 8, a first vector read operation may fetch 8 contiguous activation elements (e.g., elements 1-8 in the input tensor). A second vector read operation may, in various circumstances and dependent on the increment specified in the instructions and addressing patterns generated by the compiler, fetch a) the next 8 activation elements (e.g., elements 9-16 in the input tensor) b) an overlapping collection of 4 previously read elements and 4 new elements (e.g., elements 5-12), or c) some other combination of previously read elements and new elements along one or more parallelization dimensions. The instructions and addressing patterns generated by the compiler may also control how to broadcast, multicast, and/or otherwise distribute the activation elements across subarrays of MAC computation units.

In one example, if the size of the input tensor in the channel dimension, C, is greater than the common height of the subarrays, e.g., 8, the instructions generated by the compiler may be operable by the tensor processors to read 8 values along the C dimension with each vector read operation. In another example, if the size of the input tensor in the channel dimension, C, is equal to 1, the instructions generated by the compiler may be operable by the tensor processors to read 8 values along the width dimension, W, with each vector read operation. In yet another example, if the size of the input tensor in the channel dimension, C, is equal to 1 and the size of the input tensor in the width dimension, W, is equal to 2, the instructions generated by the compiler may be operable by the tensor processors to read, with each 8-element vector read operation, 2 sets of 4 activations, each set having a different value in the W dimension. In this example, the compiler may also determine how to arrange, retrieve, and distribute the filter weights applicable to each activation to the appropriate subarrays for performing the required convolutions.

In some cases, the instructions generated by the compiler may take advantage of these hardware capabilities to emulate a sliding window process across multiple subarrays of MAC computation units within the compute array of a tensor processor. Continuing the example illustrated in FIG. 10 and described above in which the input tensor has a single channel, and in which the size of the input tensor in the width direction and the filter tensor width, S, are equal to 3, 8 contiguous activations may be read from the activation memory that have the same values in the H and N dimensions, but that have different values in the W dimension. As in the previous example, each subarray of MAC computation units may utilize 3 rows of MAC computation units to perform computations on 3 of the activations read from the activation memory that have a single channel, that have the same values in the H and N dimensions, but that have different values in the W dimension. In at least some embodiments, to emulate a sliding window, the same set of 8 activation elements may be provided to all four subarrays of a compute array and each subarray may process a portion of the input vector from the perspective of a different position of a sliding window across the input tensor. An example of sliding window emulation is further illustrated in FIGS. 12A through 12D. In this example, in the first cycle of a multi-cycle operation corresponding to a single neural network layer, a set of 8 activation elements is fetched and provided to all four subarrays. This 8-element input vector may correspond to a row in the W dimension of the input tensor and each subarray may process three of those 8 activation elements by applying the same 3×8 filter kernel, in turn. In this example, it is assumed that the size of the input tensor in both the height (H) and width (W) dimensions is equal to 8. As in the previous example, the weights applied in each column of each 8×8 subarray of MAC computation units correspond to respective 3D filters having different values in the K dimension, and three rows of weights may be used in the computation. The weights applied on each row of the subarray have the same values in the channel dimension (where C is always equal to 1), but different values in the S dimension.

Figure 12A:
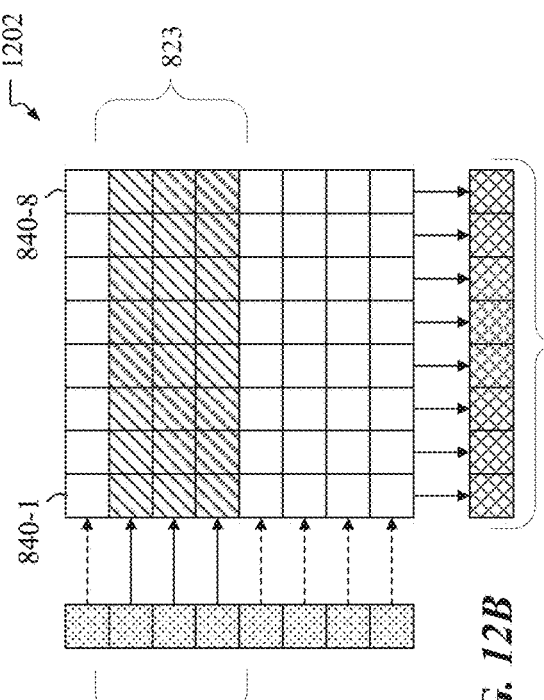
FIGS. 12A through 12D illustrate the emulation of a sliding window for an example convolution in which there is a single input tensor channel and in which the parallelization dimension is the width dimension.

For example, FIG. 12A illustrates a convolution operation performed by a first subarray 1201 of the compute array in a tensor processor during the first cycle of a multi-cycle operation. In FIG. 12A, a first 3-element subset of the 8-element input vector, shown as subset 812, is provided to a first subset of MAC computation units 822, which includes the first three rows of subarray 1201. The MAC computation units in the first three rows 822 of the first subarray 1201 may operate on the first, second, and third activations read from the memory, respectively, using weights 840 from respective filter kernels, and the weights provided to the rows of MAC computation units other than the row in the first subset of MAC computation units 822 may be zeroed out, such that they do not contribute to a first portion of the output tensor, shown as output vector 833, which is generated by subarray 1201 during the first cycle.

Figure 12B:
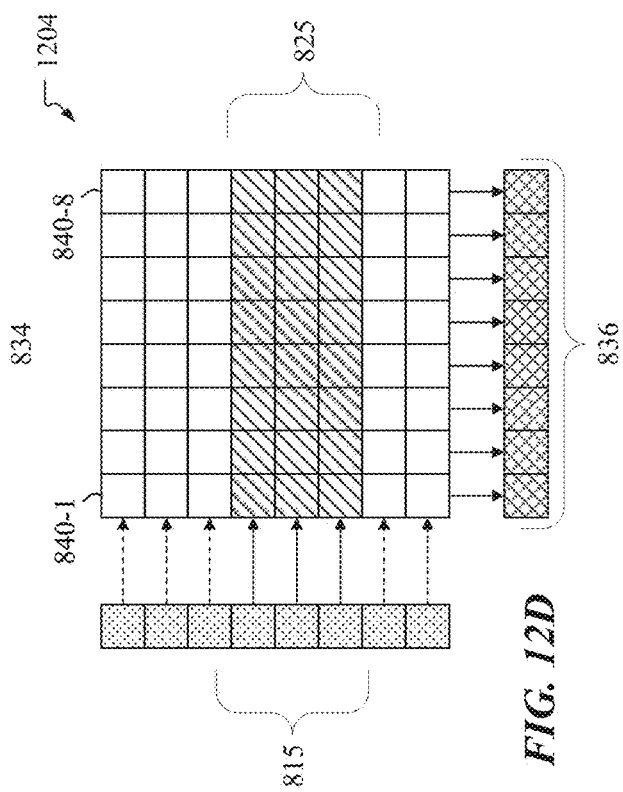

FIG. 12B illustrates a convolution operation performed by a second subarray 1202 of the compute array during the first cycle of the multi-cycle operation. In FIG. 12B, a second 3-element subset of the 8-element input vector, shown as subset 813, is provided to a second subset of MAC computation units 823, which includes the second, third, and fourth rows of subarray 1202. The MAC computation units in these three rows 823 of the second subarray 1202 may operate on the second, third, and fourth activations read from the memory, respectively, using weights 840 from respective filter kernels, and the weights provided to the rows of MAC computation units other than the rows in the second subset of MAC computation units 823 may be zeroed out, such that they do not contribute to a second portion of the output tensor, shown as output vector 834, which is generated by subarray 1202 during the first cycle. In this example, the 3×8 set of weights provided to the second subset of rows 823 in subarray 1202 is the same 3×8 set of weights provided to the first subset of rows 822 in subarray 1201 that have been shifted down by one row to apply the weights to a different portion of the input tensor, emulating a sliding window that traverses the input tensor in the width (or x) direction.

Figure 12C:
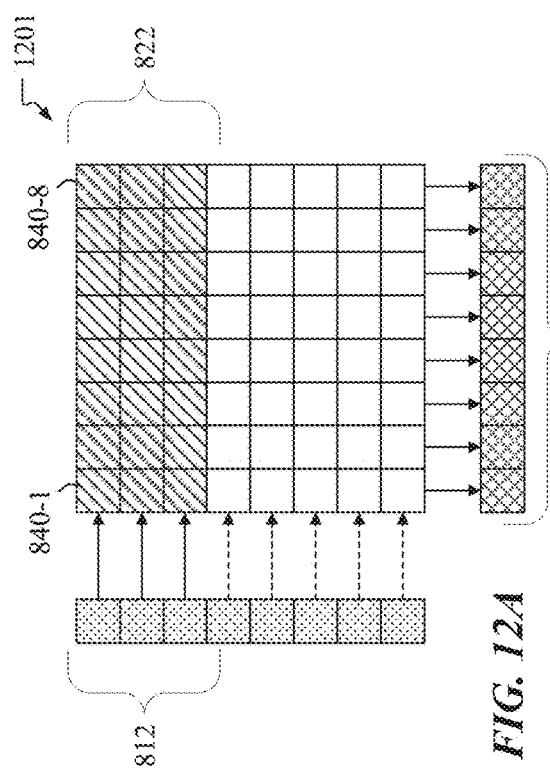

FIG. 12C illustrates a convolution operation performed by a third subarray 1203 of the compute array during the first cycle of the multi-cycle operation. In FIG. 12C, a third 3-element subset of the 8-element input vector, shown as subset 814, is provided to a third subset of MAC computation units 824, which includes the third, fourth, and fifth rows of subarray 1203. The MAC computation units in these three rows 824 of the third subarray 1203 may operate on the third, fourth, and fifth activations read from the memory, respectively, using weights 840 from respective filter kernels, and the weights provided to the rows of MAC computation units other than the rows in the third subset of MAC computation units 824 may be zeroed out, such that they do not contribute to the third portion of the output tensor, shown as output vector 835, which is generated by subarray 1203 during the first cycle. In this example, the 3×8 set of weights provided to the third subset of rows 824 in subarray 1201 is the same 3×8 set of weights provided to the first subset of rows 822 in subarray 1201 and the second subset of rows 823 in subarray 1202 that have been shifted down by one additional row to apply the weights to a different portion of the input tensor, emulating a sliding window that traverses the input tensor in the width (or x) direction.

Figure 12D:
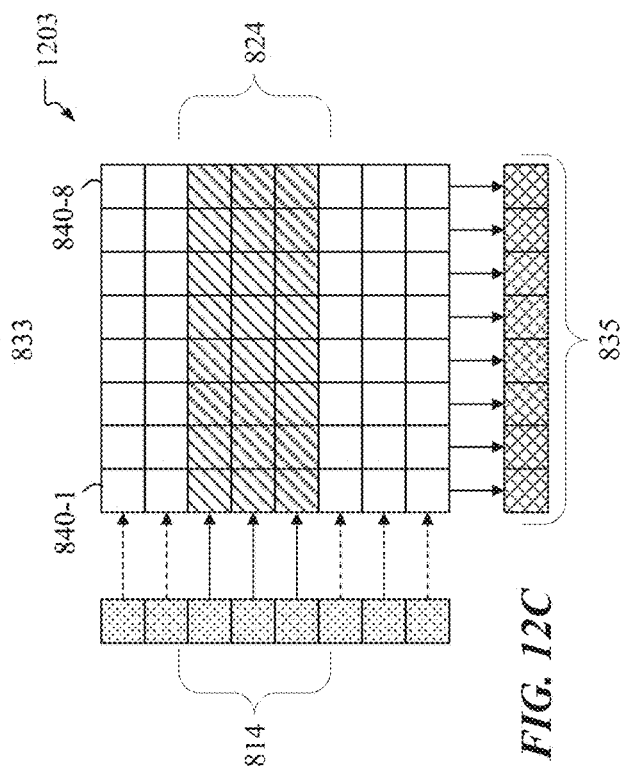

FIG. 12D illustrates a convolution operation performed by a fourth subarray 1204 of the compute array during the first cycle of the multi-cycle operation. In FIG. 12D, a fourth 3-element subset of the 8-element input vector, shown as subset 815, is provided to a fourth subset of MAC computation units 825, which includes the fourth, fifth, and sixth rows of subarray 1204. The MAC computation units in these three rows 825 of the fourth subarray 1204 may operate on the fourth, fifth, and sixth activations read from the memory, respectively, using weights 840 from respective filter kernels, and the weights provided to the rows of MAC computation units other than the rows in the fourth subset of MAC computation units 825 may be zeroed out, such that they do not contribute to the fourth portion of the output tensor, shown as output vector 836, which is generated by subarray 1202 during the first cycle. In this example, the 3×8 set of weights provided to the fourth subset of rows 825 in subarray 1204 is the same 3×8 set of weights provided to the first subset of rows 822 in subarray 1201, the second subset of rows 823 in subarray 1202, and the third subset of rows 824 in subarray 1203 that have been shifted down by one additional row to apply the weights to a different portion of the input tensor, emulating a sliding window that traverses the input tensor in the width (or x) direction.

In this example, in each additional cycle, a new vector of input activations may be read from memory and provided to all four subarrays 1201-1204 for processing, but the new vector may partially overlap the vector read from memory in the previous cycle. For example, in the second cycle of the multi-cycle operation described above, a second set of 8 activation elements is fetched and provided to all four subarrays 1201-1204. This second 8-element input vector may include the last 4 activation elements from the first row in the W dimension of the input tensor (e.g., the fifth, sixth, seventh, and eight activation elements in the input tensor) and the first four activation elements from the second row in the W dimension of the input tensor (e.g., the ninth, tenth, eleventh, and twelfth activation elements in the input tensor), and each subarray may process three of those 8 activation elements by applying the same 3×8 filter kernel, in turn. For example, subarray 1201 may process the fifth, sixth, and seventh activation elements using the MAC computation units in the first subset of rows 822, subarray 1202 may process the sixth, seventh, and eighth activation elements using the MAC computation units in the second subset of rows 823, subarray 1203 may process the seventh, eighth, and ninth activation elements using the MAC computation units in the third subset of rows 824, subarray 1204 may process the eighth, ninth, and tenth activation elements using the MAC computation units in the fourth subset of rows 825.

In some applications, including some AR/VR applications, the input to the first layer of the CNN may be a tensor with a single channel, but the input to one or more layers other than the first layer of the CNN may be a tensor with multiple channels, such as a number of channels that is greater than or equal to the width of the subarrays of MAC computation units in the compute array of the tensor processor. For example, typically, the K output channels generated at the first layer, which is constrained by the number of 3D filters applied to the input tensor, may become the C input channels for the next layer in the CNN, where C=K. In these applications, the compiler may, for the layers other than the first layer, generate instructions that cause each vector read operation to read contiguous activations from the activation memory that have the same values in the N, H, and W dimensions but different values in the C dimension, leading to an efficient use of the compute resources in the 8×8 subarray of MAC computation units for those layers, as described above.

Figure 13:
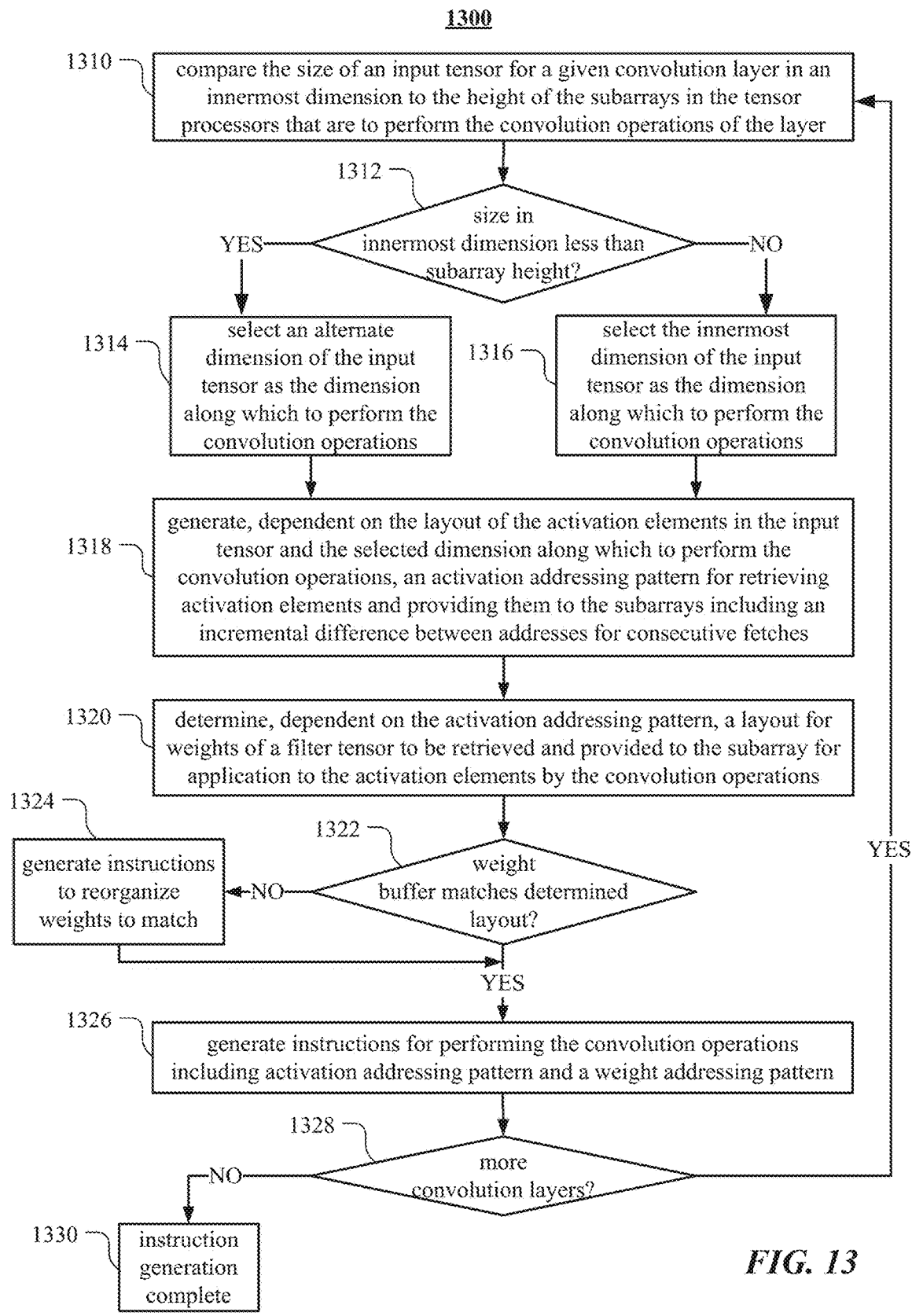
FIG. 13 illustrates an example method for generating instructions for performing convolution in a multi-layer CNN.

FIG. 13 illustrates an example method for generating instructions for performing convolution in a multi-layer CNN. In various embodiments, some or all of the operations shown in FIG. 13 may be performed by a compiler, such as compiler 610 illustrated in FIG. 6. The method may begin at step 1310, with comparing the size of an input tensor for a given convolution layer of the CNN in an innermost dimension, which may be a typical or default dimension along which to parallelize the convolution operations, to the common height of the subarrays in the tensor processors that are to perform the convolution operations of the layer. For example, a four-dimensional input tensor may be of size N×H×W×C where C (channel) is the innermost dimension, followed by W (width), H (height), and finally N (batch size) as the outermost dimension and the method may include comparing the size of the input tensor in the channel dimension to the to the common height of the subarrays.

If, at step 1312, it is determined that the size of the input tensor in the innermost dimension is less than the common height of the subarrays, method 1300 may continue at 1314. Otherwise, the method may proceed to 1316.

At 1314, the method may include selecting an alternate dimension of the input tensor as the dimension along which to perform the convolution operations. For example, if the size of the input tensor in the channel dimension, as the innermost dimension, is less than the common height of the subarrays, the method may include selecting the width dimension or the height dimension as the dimension of the input tensor along which to parallelize the convolution operations.

At 1316, method 1300 may include selecting the innermost dimension of the input tensor as the dimension along which to perform the convolution operations. For example, if the size of the input tensor in the channel dimension, as the innermost dimension, is greater than or equal to the common height of the subarrays, the method may include selecting the channel dimension as the dimension of the input tensor along which to parallelize the convolution operations.

At 1318, the method may include generating, dependent on the layout of the activation elements in the input tensor and the selected dimension along which to perform the convolution operations, an activation addressing pattern for retrieving activation elements and providing them to the subarrays. Generating the activation addressing pattern may include determining an incremental difference between addresses at which consecutive vector read operations fetch data. For example, in some embodiments and under certain circumstances, the incremental difference between addresses at which consecutive vector read operations fetch data, i.e., the granularity at which vectors of input activations are read, may be less than the vector read size.

At 1320, method 1300 may include determining, dependent on the activation addressing pattern, a corresponding layout for weights of a filter tensor to be retrieved and provided to the subarray for application to the activation elements by the convolution operations. For example, the determined layout for the weights of the filter tensor may be such that the weights provided to the MAC computation units in each subarray are applicable to the activation elements to be processed by those MAC computation units, with the weights being parallelized in the MAC arrays along dimensions of the filter tensor that are selected based on the dimension of the input tensor dimension along which the convolution operations are to be performed.

If, at 1322 it is determined that the layout of the weights in the weight buffer matches the determined layout, method 1300 continues to 1326. Otherwise, the method proceeds to 1324.

At 1324, method 1300 may include generating instructions to reorganize the weights to match the determined layout, after which the method proceeds to 1326.

At 1326, the method may include generating instructions for performing the convolution operations, the instructions including the determined activation addressing pattern and the generating including generating a corresponding weight addressing pattern.

If, at 1328, there are additional convolution layers in the CNN for which instructions are to be generated, method 1300 may return to 1310 and the operations shown in steps 1310 through 1326 are repeated, as appropriate, one or more times until instructions have been generated for all convolution layers in the CNN.

However, if, or when, at 1328, there are no additional convolution layers in the CNN for which instructions are to be generated, method 1300 concludes at 1330, wherein the instruction generation is complete.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13, which may include all, some, or none of the steps of the method of FIG. 13, where appropriate, occurring in any suitable order. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

The machine learning accelerators, tensor processors, and corresponding compilers described herein may provide technical advantages when compared to existing machine learning accelerators with fixed-size arrays of computation units and corresponding computations. These advantages may include supporting flexible compute array utilization for a variety of convolution layer shapes based on the configuration and dimensions of the input feature map. For example, these machine learning accelerators, tensor processors and compilers may providing higher resource utilization than existing accelerators when the size of the input tensor in an innermost dimension, such as the channel dimension, is smaller than the common height of the constituent subarrays of computation units in the tensor processor, including when the input tensor has only a single channel. While the example ML accelerators described herein are relatively small, e.g., with 256 MAC computation units in each of four tensor processors within each of four tensor processor clusters, the multi-level control architecture described herein is scalable for larger problem spaces. The disclosed machine learning accelerators, tensor processors, and corresponding compilers may include a different number of MAC computation units organized in a different number of subarrays and may be used to perform convolution operations for any of a variety of neural network solutions to machine learning problems including, but not limited to, object identification, feature classification, or content-driven image processing. The disclosed machine learning accelerators, tensor processors, and corresponding compilers may be particularly well suited for applications in which convolution shapes and sizes can vary widely, such as in AR/VR applications.

Figure 14:
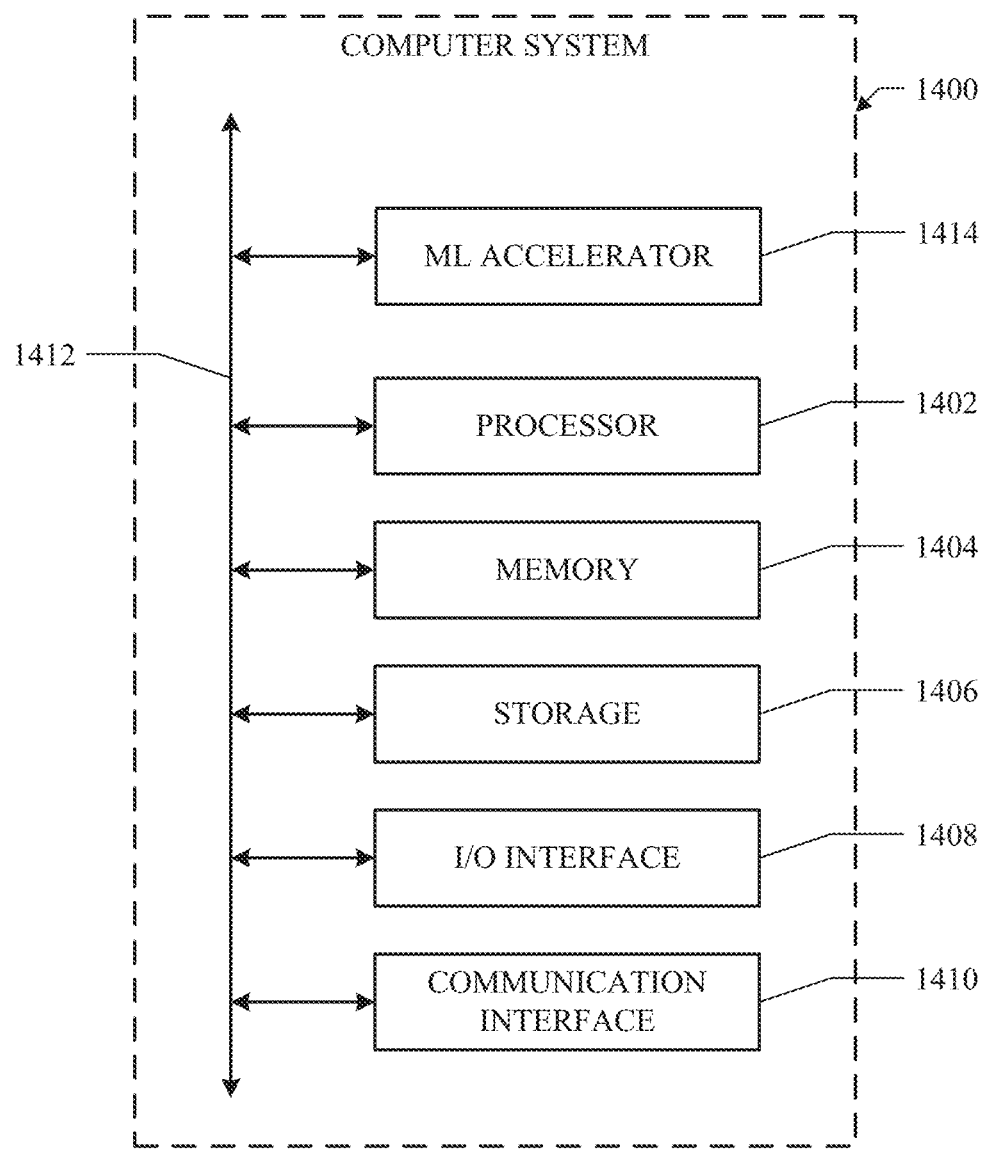
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an AR/VR reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example, and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, a bus 1412, and an ML accelerator 1414. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example, and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example, and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, ML accelerator 1414 may be similar to ML accelerator 620 illustrated in FIG. 6, or ML accelerator 700 illustrated in FIG. 7A. As such, particular instructions of computer programs for machine learning applications that use a convolutional neural network may be translated into tensor instructions for execution by various computational elements of ML accelerator 1414, as described herein. In particular embodiments, ML accelerator 1414 may be implemented using hardware and/or software elements in any suitable combination. As described herein, ML accelerator 1414 may include multiple tensor processor clusters and underlying tensor processors, each of which may include local memory for storing input features, weights for 2D kernels of various multi-dimensional filters, and/or output features of various convolution operations (not shown in FIG. 14). In particular embodiments, these local memories may be loaded from storage 1406, memory 1404, or from another source (such as, for example, another computer system 1400). The use of ML accelerator 1414 to execute the tensor instructions may improve the overall performance and resource utilization of computer system 1400 for those applications when compared to executing them using processor 1402 or using an existing ML accelerator. As described in detail herein, the tensor processors of ML accelerator 1414 may be constructed in accordance with a flexible tensor processor architecture in which computation components are organized such that a given tensor processor can support a variety of convolution layer shapes with high resource utilization and high reuse of locally available data.

In particular embodiments, memory 1404 includes main memory for storing instructions for processor 1402 to execute or data for processor 1402 to operate on. In some embodiments, memory 1404 may store instructions executable by processor 1402 to implement a compiler, such as compiler 610 illustrated in FIG. 6, that generates instructions for ML accelerator 1414, as described herein. In other embodiments, instructions executable by a processor (such as processor 1402) to implement compiler 610 may be stored in a memory (such as memory 1404) of a computer system 1400 other than a computer system comprising an ML accelerator 1414 for which the compiler 610 generates instructions. As an example, and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example, and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example, and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example, and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for machine-learning acceleration, comprising:
   receiving instructions to perform convolution on an input tensor using weights in a filter tensor;
   determining a size of a first dimension of the input tensor;
   in response to determining that the size is less than a processing capacity of each of one or more subarrays of computation units in a tensor processor, selecting a second dimension of the input tensor along which to perform the convolution;
   selecting, based on the second dimension, one or more dimensions of the filter tensor;
   generating (1) first instructions for reading, using vector read operations, activation elements in the input tensor organized such that activation elements with different values in the second dimension are stored contiguously in memory, and (2) second instructions for reading weights of the filter tensor along the selected one or more dimensions; and
   using the first instructions and the second instructions to provide the activation elements and the weights to the one or more subarrays.

2. The method of claim 1, wherein generating the first instructions comprises generating instructions for performing vector read operations at addresses having a granularity less than the vector read size such that consecutive vector read operations fetch overlapping collections of activation elements.

3. The method of claim 1, wherein:
   the input tensor is a multi-dimensional tensor comprising at least an innermost channel dimension, a width dimension, and a height dimension;
   the first dimension is the channel dimension;
   the size of the first dimension of the input tensor is equal to one; and
   the second dimension is the width dimension or the height dimension.

4. The method of claim 1, wherein:
   the filter tensor comprises one or more three-dimensional (3D) filter tensors of weights, each comprising a filter depth dimension, a filter width dimension, and a filter height dimension;

the size of the filter tensor in the filter depth dimension is equal to the size of the first dimension of the input tensor;

the selected one or more dimensions of the filter tensor comprise one or more of the filter width dimension and the filter height dimension; and the method further comprises storing the weights in a weight buffer such that weights with different values in a first one of the selected one or more dimensions of the filter tensor are stored contiguously in the weight buffer.

5. The method of claim 1, wherein:

the filter tensor comprises one or more three-dimensional (3D) filter tensors of weights;

each of the one or more subarrays of computation units in the tensor processor comprises a two-dimensional array of multiply-and-accumulate (MAC) computation units that operate in parallel to apply weights defined for one or more of the 3D filter tensors to a respective subset of a spatial partition of the input tensor and produce a respective subset of a spatial partition of an output tensor, the two-dimensional arrays in the one or more subarrays having a common subarray width and a common subarray height; and determining that the size is less than the processing capacity of each of the one or more subarrays of computation units in the tensor processor comprises determining that the size is less than the common subarray height.

6. The method of claim 5, wherein using the first instructions and the second instructions to provide the activation elements and the weights to the one or more subarrays comprises, in a first cycle of a multi-cycle convolution:

providing a same first collection of activation elements to two or more subarrays, the first collection of activation elements corresponding to a first one of the vector read operations;

providing a same collection of weights to the two or more subarrays; and processing, by each of the two or more subarrays, a respective subset of the first collection of activation elements while applying the collection of weights.

7. The method of claim 6, further comprising, in a second cycle of the multi-cycle convolution:

providing a same second collection of activation elements to the two or more subarrays, the second collection of activation elements corresponding to a second one of the vector read operations and comprising a subset of the first collection of activation elements and additional activation elements stored contiguous to the subset of the first collection of activation elements in the activation memory;

providing the collection of weights to the two or more subarrays; and processing, by each of the two or more subarrays, a respective subset of the second collection of activation elements while applying the collection of weights.

8. The method of claim 6, wherein processing a respective subset of the first collection of activation elements comprises:

providing the subset of the first collection of activation elements to a respective subset of the MAC computation units in each of the two or more subarrays;

providing a subset of the collection of weights to the respective subset of the MAC computation units in each of the two or more subarrays; and providing weight values equal to zero to the MAC computation units in each of the two or more subarrays other than the respective subsets of the MAC computation units in each of the two or more subarrays.

9. The method of claim 1, further comprising, in response to determining that the size is less than the processing capacity of each of the one or more subarrays of computation units in the tensor processor, storing the activation elements in the input tensor in an activation memory such that activation elements with different values in the second dimension are stored contiguously in the activation memory.

10. A system for machine-learning acceleration, comprising:

one or more processors; and one or more computer-readable non-transitory storage media coupled to one or more of the processors and comprising program instructions operable when executed by one or more of the processors to cause the system to:

receive instructions to perform convolution on an input tensor using weights in a filter tensor;

determine a size of a first dimension of the input tensor;

in response to determining that the size is less than a processing capacity of each of one or more subarrays of computation units in a tensor processor, select a second dimension of the input tensor along which to perform the convolution;

select, based on the second dimension, one or more dimensions of the filter tensor;

generate (1) first instructions for reading, using vector read operations, activation elements in the input tensor organized such that activation elements with different values in the second dimension are stored contiguously in memory, and (2) second instructions for reading weights of the filter tensor along the selected one or more dimensions; and use the first instructions and the second instructions to provide the activation elements and the weights to the one or more subarrays.

11. The system of claim 10, wherein to generate the first instructions, the program instructions are further operable to cause the system to generate instructions for performing vector read operations at addresses having a granularity less than the vector read size such that consecutive vector read operations fetch overlapping collections of activation elements.

12. The system of claim 10, wherein:

the filter tensor comprises one or more three-dimensional (3D) filter tensors of weights, each comprising a filter depth dimension, a filter width dimension, and a filter height dimension;

the size of the filter tensor in the filter depth dimension is equal to the size of the first dimension of the input tensor;

the selected one or more dimensions of the filter tensor comprise one or more of the filter width dimension and the filter height dimension; and when executed by the one or more of the processors, the instructions are further operable to cause the system to:

store the weights in a weight buffer such that weights with different values in a first one of the selected one or more dimensions of the filter tensor are stored contiguously in the weight buffer; and in response to a determination that the size is less than the processing capacity of each of the one or more subarrays of computation units in the tensor processor, store the activation elements in the input tensor in an activation memory such that activation elements with different values in the second dimension are stored contiguously in the activation memory.

13. The system of claim 10, wherein:
the filter tensor comprises one or more three-dimensional (3D) filter tensors of weights;
each of the one or more subarrays of computation units in the tensor processor comprises a two-dimensional array of multiply-and-accumulate (MAC) computation units that operate in parallel to apply weights defined for one or more of the 3D filter tensors to a respective subset of a spatial partition of the input tensor and produce a respective subset of a spatial partition of an output tensor, the two-dimensional arrays in the one or more subarrays having a common subarray width and a common subarray height; and
to determine that the size is less than the processing capacity of each of the one or more subarrays of computation units in the tensor processor, the program instructions are further operable to cause the system to determine that the size is less than the common subarray height.

14. The system of claim 13, wherein:
to use the first instructions and the second instructions to provide the activation elements and the weights to the one or more subarrays, the program instructions are further operable to cause the system to, in a first cycle of a multi-cycle convolution:
provide a same first collection of activation elements to two or more subarrays, the first collection of activation elements corresponding to a first one of the vector read operations;
provide a same collection of weights to the two or more subarrays; and
process, by each of the two or more subarrays, a respective subset of the first collection of activation elements while applying the collection of weights; and
the program instructions are further operable to cause the system to, in a second cycle of the multi-cycle convolution:
provide a same second collection of activation elements to the two or more subarrays, the second collection of activation elements corresponding to a second one of the vector read operations and comprising a subset of the first collection of activation elements and additional activation elements stored contiguous to the subset of the first collection of activation elements in the activation memory;
provide the collection of weights to the two or more subarrays; and
process, by each of the two or more subarrays, a respective subset of the second collection of activation elements while applying the collection of weights.

15. The system of claim 13, wherein:
to use the first instructions and the second instructions to provide the activation elements and the weights to the one or more subarrays, the program instructions are further operable to cause the system to, in a first cycle of a multi-cycle convolution:
provide a same first collection of activation elements to two or more subarrays, the first collection of activation elements corresponding to a first one of the vector read operations;
provide a same collection of weights to the two or more subarrays; and
process, by each of the two or more subarrays, a respective subset of the first collection of activation elements while applying the collection of weights, the processing comprising:
providing the subset of the first collection of activation elements to a respective subset of the MAC computation units in each of the two or more subarrays;
providing a subset of the collection of weights to the respective subset of the MAC computation units in each of the two or more subarrays; and
providing weight values equal to zero to the MAC computation units in each of the two or more subarrays other than the respective subsets of the MAC computation units in each of the two or more subarrays.

16. One or more computer-readable non-transitory storage media embodying software that is operable when executed to:
receive instructions to perform convolution on an input tensor using weights in a filter tensor;
determine a size of a first dimension of the input tensor;
in response to determining that the size is less than a processing capacity of each of one or more subarrays of computation units in a tensor processor, select a second dimension of the input tensor along which to perform the convolution;
select, based on the second dimension, one or more dimensions of the filter tensor;
generate (1) first instructions for reading, using vector read operations, activation elements in the input tensor organized such that activation elements with different values in the second dimension are stored contiguously in memory, and (2) second instructions for reading weights of the filter tensor along the selected one or more dimensions; and
use the first instructions and the second instructions to provide the activation elements and the weights to the one or more subarrays.

17. The media of claim 16, wherein:
the filter tensor comprises one or more three-dimensional (3D) filter tensors of weights comprising a filter depth dimension, a filter width dimension, and a filter height dimension;
the size of the filter tensor in the filter depth dimension is equal to the size of the first dimension of the input tensor;
the selected one or more dimensions of the filter tensor comprise one or more of the filter width dimension and the filter height dimension; and
when executed, the software is further operable to:
store the weights in a weight buffer such that weights with different values in a first one of the selected one or more dimensions of the filter tensor are stored contiguously in the weight buffer; and
in response to a determination that the size is less than the processing capacity of each of the one or more subarrays of computation units in the tensor processor, store the activation elements in the input tensor in an activation memory such that activation elements with different values in the second dimension are stored contiguously in the activation memory.

18. The media of claim 16, wherein:

the filter tensor comprises one or more three-dimensional (3D) filter tensors of weights;

each of the one or more subarrays of computation units in the tensor processor comprises a two-dimensional array of multiply-and-accumulate (MAC) computation units that operate in parallel to apply weights defined for one or more of the 3D filter tensors to a respective subset of a spatial partition of the input tensor and produce a respective subset of a spatial partition of an output tensor, the two-dimensional arrays in the one or more subarrays having a common subarray width and a common subarray height; and to determine that the size is less than the processing capacity of each of the one or more subarrays of computation units in the tensor processor, the software is further operable to determine that the size is less than the common subarray height.

19. The media of claim 18, wherein:

to use the first instructions and the second instructions to provide the activation elements and the weights to the one or more subarrays, the software is further operable to, in a first cycle of a multi-cycle convolution:

provide a same first collection of activation elements to two or more subarrays, the first collection of activation elements corresponding to a first one of the vector read operations;

provide a same collection of weights to the two or more subarrays; and process, by each of the two or more subarrays, a respective subset of the first collection of activation elements while applying the collection of weights; and the software is further operable to, in a second cycle of the multi-cycle convolution:

provide a same second collection of activation elements to the two or more subarrays, the second collection of activation elements corresponding to a second one of the vector read operations and comprising a subset of the first collection of activation elements and additional activation elements stored contiguous to the subset of the first collection of activation elements in the activation memory;

provide the collection of weights to the two or more subarrays; and process, by each of the two or more subarrays, a respective subset of the second collection of activation elements while applying the collection of weights.

20. The media of claim 18, wherein:

to use the first instructions and the second instructions to provide the activation elements and the weights to the one or more subarrays, the software is further operable to cause the system to, in a first cycle of a multi-cycle convolution:

provide a same first collection of activation elements to two or more subarrays, the first collection of activation elements corresponding to a first one of the vector read operations;

provide a same collection of weights to the two or more subarrays; and process, by each of the two or more subarrays, a respective subset of the first collection of activation elements while applying the collection of weights, the processing comprising:

providing the subset of the first collection of activation elements to a respective subset of the MAC computation units in each of the two or more subarrays;

providing a subset of the collection of weights to the respective subset of the MAC computation units in each of the two or more subarrays; and providing weight values equal to zero to the MAC computation units in each of the two or more subarrays other than the respective subsets of the MAC computation units in each of the two or more subarrays.

* * * * *